United States Patent
LoPiccolo et al.

(10) Patent No.: US 11,922,910 B1
(45) Date of Patent: Mar. 5, 2024

(54) SYSTEM FOR ORGANIZING AND DISPLAYING MUSICAL PROPERTIES IN A MUSICAL COMPOSITION

(71) Applicant: ToneStone, Inc., Brookline, MA (US)

(72) Inventors: Gregory Bernard LoPiccolo, Brookline, MA (US); Samuel Paul Levine, Brookline, MA (US)

(73) Assignee: Tonestone, Inc.

( * ) Notice: Subject to any disclaimer, the term of this patent is extended or adjusted under 35 U.S.C. 154(b) by 399 days.

(21) Appl. No.: 17/221,426

(22) Filed: Apr. 2, 2021

Related U.S. Application Data

(60) Provisional application No. 63/004,054, filed on Apr. 2, 2020.

(51) Int. Cl.
  *G06F 3/048* (2013.01)
  *G06F 3/04817* (2022.01)
  (Continued)

(52) U.S. Cl.
  CPC ....... *G10H 1/0008* (2013.01); *G06F 3/04817* (2013.01); *G06F 3/04886* (2013.01); *G06F 16/61* (2019.01); *G06F 16/64* (2019.01); *G06Q 10/101* (2013.01); *G06Q 20/1235* (2013.01); *G06Q 50/01* (2013.01); *G09B 19/00* (2013.01); *G10H 7/008* (2013.01); *G10H 2210/105* (2013.01); *G10H 2220/121* (2013.01); *G10H 2220/131* (2013.01); *G10H 2240/145* (2013.01)

(58) Field of Classification Search
  None
  See application file for complete search history.

(56) References Cited

U.S. PATENT DOCUMENTS

| | | |
|---|---|---|
| 6,429,863 B1 | 8/2002 | LoPiccolo et al. |
| 7,750,224 B1 * | 7/2010 | Rav-Niv ................ G09B 15/00 84/485 R |

(Continued)

OTHER PUBLICATIONS

Steven Gelineck, Daniel Overholt, Morten Buchert, and Jesper Andersen, Towards an Interface for Music Mixing based on Smart Tangibles and Multitouch, published in New Interface for Musical Expression, 2013, Association for Computing Machinery, Daejeon/Seoul, Republic of Korea.

(Continued)

*Primary Examiner* — Hua Lu
(74) *Attorney, Agent, or Firm* — Clocktower Law; Erik J. Heels; Michael A. Bartley

(57) ABSTRACT

A digital audio workstation organizes musical information in a visually consistent manner, such that it is easier for the user to see and to manipulate the content in a song. The organization includes a multitrack music stream, which depicts multiple adjacent streams (or "tracks") of musical content playing in parallel; a Play Bar, which is a visual plane intersecting the music stream; and two or more data layers, which are spatially aligned with the underlying musical stream, but each of which contains a specific type of musical data which can be viewed and manipulated in isolation. This approach to visual organization of music information has some major benefits to the user. Many different kinds of musical content and transformations can be depicted in a clear and consistent manner, making it easier for the user to see and manipulate the song.

19 Claims, 13 Drawing Sheets

(51) Int. Cl.
*G06F 3/04886* (2022.01)
*G06F 16/61* (2019.01)
*G06F 16/64* (2019.01)
*G06Q 10/101* (2023.01)
*G06Q 20/12* (2012.01)
*G06Q 50/00* (2012.01)
*G09B 19/00* (2006.01)
*G10H 1/00* (2006.01)
*G10H 7/00* (2006.01)

(56) References Cited

U.S. PATENT DOCUMENTS

| | | | | |
|---|---|---|---|---|
| 8,332,757 | B1* | 12/2012 | Davey | G11B 27/034 |
| | | | | 715/723 |
| 8,975,500 | B2 | 3/2015 | Iriyama | |
| 9,076,418 | B2 | 7/2015 | Engeling et al. | |
| 9,323,438 | B2 | 4/2016 | Khan et al. | |
| 10,102,836 | B2* | 10/2018 | Mintz | A63F 1/04 |
| 11,086,586 | B1* | 8/2021 | Bernett | G06F 3/147 |
| 2008/0030462 | A1* | 2/2008 | Lasar | G06Q 10/10 |
| | | | | 345/156 |
| 2008/0167106 | A1* | 7/2008 | Lutnick | G07F 17/32 |
| | | | | 463/16 |
| 2012/0210221 | A1* | 8/2012 | Khan | H04N 5/2628 |
| | | | | 715/716 |
| 2012/0331558 | A1* | 12/2012 | Van Vleck | G06Q 30/06 |
| | | | | 711/100 |
| 2013/0112062 | A1* | 5/2013 | Iriyama | G10H 1/0008 |
| | | | | 84/453 |
| 2013/0112067 | A1* | 5/2013 | Lengeling | G10H 1/46 |
| | | | | 84/645 |
| 2013/0159852 | A1* | 6/2013 | Classen | G06F 3/165 |
| | | | | 700/94 |
| 2014/0229270 | A1* | 8/2014 | Rashwan | G06Q 30/0277 |
| | | | | 705/14.43 |
| 2017/0124045 | A1* | 5/2017 | Canton | G06V 30/412 |
| 2017/0124048 | A1* | 5/2017 | Campbell | G06F 40/18 |
| 2017/0186411 | A1* | 6/2017 | Mintz | A63F 3/00119 |
| 2021/0357580 | A1* | 11/2021 | Silano | G06F 3/04847 |

OTHER PUBLICATIONS

Armin Namavari, Dawpl: A Simple Rust Based DSL For Algorithmic Composition and Music Production, Association for Computing Machinery, vol. 1 No. 1, Dec. 2017, published online at stanford-cs242.github.io/f17/projects/2017/.

* cited by examiner

SYSTEM FOR ORGANIZING AND DISPLAYING MUSICAL PROPERTIES IN A MUSICAL COMPOSITION

CROSS-REFERENCE TO RELATED APPLICATIONS

This utility patent application claims priority from U.S. provisional patent application Ser. No. 63/004,054, filed Apr. 2, 2020, titled "System for Organizing and Displaying Musical Properties in a Musical Composition" naming inventors Gregory Bernard LoPiccolo and Samuel Paul Levine.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2021, ToneStone, Inc.

BACKGROUND

Field of Technology

This relates to a method of organizing and visually depicting musical data, such that it is easier for the user to see and to manipulate the content in a musical composition.

Background

Most music created today is composed, recorded, or edited using commercially available software. This software is available in a range of price points and levels of sophistication. This range includes software referred to as Digital Audio Workstations, or DAWs—which are commonly used by professionals, but also includes software that runs on tablets, smartphones and similar portable computing devices. Much of this software is available either for outright purchase, or through a subscription. A thriving global industry exists to develop this software.

Digital Audio Workstations, or DAWs, are widely adopted software programs used for music composition and production. Current DAW software programs provide a number of different features to allow users to create or modify music in a variety of ways, such as affecting sonic characteristics of the composition, including, but not limited to:

The timbral characteristics of each instrument or sound.
Various sonic manipulations and effects applied to instruments and sounds (such as reverb, echo, or distortion).
Harmonic and pitch alterations of the written music that are applied as transformations to the fixed score.
Repeats or looping of some or all instruments or sounds in the time domain.

These features are accessed through visual interfaces, which the user is obliged to learn and navigate in order to use these features. However, these visual interfaces are not always easy or intuitive to learn or use.

DESCRIPTION OF PRIOR ART

Existing music production software allows many musical properties and parameters to be dynamically affected at any point in the composition or production process. Pitch, key, tempo and effects settings can be continuously varied while composing or producing music. These abilities constitute a powerful, flexible approach to composition and performance. However, most existing music production software is grounded in traditional user interface paradigms (such as mixing consoles or hardware step sequencers) that are a poor fit for the underlying creative abilities of modern software, but persist because software developers and users are familiar with them.

Some of the actions that can be performed on music content in a conventional DAW include:
Applying audio effects such as reverb, echo, or distortion.
Changing the tempo at which playback occurs.
Transposing the content to a different musical pitch, or key.
Adjusting the volume or "pan (position in a stereo field)" of the content relative to other music.
Grouping the content with other content to create a larger musical component.

However, applying these changes to the audio content in a conventional DAW requires the user to access a number of different controls and user interfaces, each configured to make one specific type of alteration. Because of this traditional approach to user interface design, users are obliged to learn and use a multiplicity of different interfaces that exist within the same software. Examples of commercially available software programs for which this is true include:
Ableton Live
Logic Pro
GarageBand
Digital Performer
Cubase
FL Studio
Reason Studios A specific example is illustrated through Reason, a popular DAW, as illustrated in screenshot recreations shown in FIGS. 1 and 2. To apply an echo effect to vocal track 100, it is necessary to touch the UI at points 110, 120, and 200—spread across a complex set of screens.

The user must:
Match up the linear track 100 with the corresponding mixer channel
Turn on the FX buss 110 associated with the specific echo effect desired
Adjust the amount of signal going to and from the echo effect unit 120
Call up the specific desired settings on the echo effect unit 200

This workflow is far more complex than it needs to be, and is not unique to this DAW. Each DAW has a variant of this type of signal flow and creative toolset. They all suffer from the same design deficit—they don't present the musical content and creative tools to be applied to that content in a visually and conceptually consistent way.

U.S. Patents

U.S. Pat. No. 7,750,224 ("MUSICAL COMPOSITION USER INTERFACE REPRESENTATION", of inventors Rav-Niv et al., issued Jul. 6, 2010) discloses, in the Abstract, "Graphical musical user interface representation for presenting a stringed musical instrument composition, the stringed musical instrument composition including a plurality of note representations, the graphical musical user interface representation including a plurality of graphically encoded note path representations that include a plurality of graphically encoded note representations, and a plurality of graphically encoded note transitions, the plurality of graphically encoded note path representations are located in a coordinate system of the graphical musical user interface representation, each of the graphically encoded note path representations corresponding to a respective open-string pitch, of a respective string of a stringed musical instrument, the plurality of graphically encoded note representation are of a respective note group of note representations, the respective note group being associated with the respective string, each of the graphically encoded note path representations being encoded according to a respective graphical code, the respective graphical code being respective of said respective open-string pitch, each of the graphically encoded note representations representing respective tonal characteristics, relative to the respective open-string pitch, according to a coordinate of the respective graphically encoded note representation, in the coordinate system, and according to the respective graphical code, the plurality of graphically encoded note transitions being respective of the respective note group, each of the graphically encoded note transitions being encoded according to the respective graphical code."

U.S. Patent Application Publications

United States Patent Application Publication 2013/0159852 ("SYSTEMS AND METHODS FOR ADJUSTING AUDIO ATTRIBUTES OF CLIP-BASED AUDIO CONTENT", of inventors Classen et al, published Jun. 20, 2013) discloses, in the Abstract, "Systems and methods are disclosed to adjust the loudness or another audio attribute for one or more audio clips. Intra-track audio levels can automatically be equalized, for example, to achieve a homogeneous audio level for all clips within an audio track. Information about such audio adjustments may be identified and stored as information without destructively altering the underlying clip content. For example, keyframes may define changes to a fader that will be applied at different points along a track's timeline to achieve the audio adjustments when the track is played. An audio editing application can provide a feature for automatically determining appropriate keyframes, allow manual editing of keyframes, and use keyframes to display control curves that represent graphically the time-based adjustments made to track-specific faders, play test audio output, and output combined audio, among other things."

United States Patent Application Publication 2008/0030462 ("INTERACTIVE MUSIC INTERFACE FOR MUSIC PRODUCTION", of inventor Lasar, published Feb. 7, 2008) discloses, in the Abstract, "A system for composing music provides the user with a user interface allowing the user to select music clips. The clips can include intros, loops, and ends, and the user can be allowed to search them by theme. The invention can be implemented on a standalone computer or over the Internet or other network."

None of the above provides a system 1) for music composition which 2) provides a three-dimensional representation of 3) multiple underlying tracks with 4) stacked layers of functional effects within a user interface enabling 5) visually and conceptually consistent creation and editing tools. What is needed, therefore, is a system that overcomes the above-mentioned limitations and that includes the features enumerated above.

BRIEF SUMMARY

A new solution involves a user interface and related data structures that organize musical information in a visually consistent manner, such that it is easier for the user to perceive and to manipulate the content in a song.

In this solution, Layers are separately addressable axes of musical information or control, which may be applied to multi-track musical content flexibly, efficiently and intuitively. Music clips are modular units of musical content that are deployed on a grid. This grid is the same form factor as any other DAW: discrete tracks proceeding in parallel toward a point in time where they are rendered into music, or stationary tracks with a cursor sweeping across them. Music clips are the entities that Layers act upon.

Where possible, different Layers are represented by their own Clip types. These Clips may be deployed onto the grid, "on top" of the Music Clips that actually generate the music. In this way, all relevant musical transformations are visible on the same surface at the same time—which is a lot easier to understand and to manipulate than prior schemes.

Thus, two or more data layers are spatially aligned with the underlying musical stream. Each contains a specific type of musical data, each of which may be viewed and manipulated in isolation. These data layers align with the stack of clips such that the underlying layer includes music clips, and upper layers include various functional clips.

Every Layer has a unique visual representation, indicating if it is being applied in any given grid square (or assigned "infinitely"), and what parameters it is set to, as appropriate. These visuals may be representational, numeric, color values—whatever most efficiently communicates the required information. Every Layer has a unique control scheme. For most Layers, this involves deploying Clips onto the Timeline. Every Layer has the ability to be controlled either by the player or by the software engine; driven statically by a script, or dynamically by systems that respond to player behavior.

An underlying data structure facilitates the application, configuration and understanding of clips. A clip applied in a layer might apply to a single underlying grid square, a music clip, one or more music clips in a track, or one or more music clips in a bar. The order of the layers may have an implication on the order in which the clips in each layer are applied to the underlying music clip.

Features and Advantages

This approach to visual and conceptual organization of music information has some major benefits to the user. Many different kinds of musical content and transformations can be depicted in a clear and consistent manner, making it easier for the user to see and manipulate the song.

This approach has a few big benefits:
Any musical transformation can easily be applied to exactly the grid squares, Clips, Bars or Tracks that the user wants, in one unified interface, with unique visual feedback for each transformation. Users can see exactly what is going on. Examples include:
Transpositions may be applied to pitched instruments
Effects may be applied to a track, a set of tracks, or a set of clips at a specific time in a track.
A filter sweep or audio fade may be applied to some or all tracks, and can be stretched to be any length.
If the visuals clearly depict the musical state of the system, and any Layer can be placed under system control, then a whole set of musical activities become possible:
The system can manage some Layers while the player is learning to master others—for instance, players could swap different Music Clips into a track with a chord progression driven by the Transposition Layer.

The software platform (or the user community) can craft and share scripted levels or templates with some Layers filled, and others to be populated by users.

Collaboration between players can be orchestrated by distributing control over different Layers to different players.

The intuitive presentation of music clips and layers of different types of harmonic, mixing and production effects as well as the ability to shift perspectives among different slices of a song (one or more grid squares, music clips, tracks, bars and layers) provides multiple, connected views of a song.

These multiple, connected views of a song simplify instruction in song creation and editing that focus on these individual perspectives. One lesson might focus on different production effects across different classes of music clips, for example.

These multiple, connected views of a song enable the application of game mechanics to the user's experience to more effectively teach the user to create better songs.

These multiple connected views of a song are reflected in the user interface, enabling the user to visualize and edit the same songs from different perspectives at different points of the composition and editing process.

BRIEF DESCRIPTION OF THE DRAWINGS

In the drawings, closely related figures and items have the same number but different alphabetic suffixes. Processes, states, statuses, and databases are named for their respective functions.

FIG. 13 illustrates an example of Goals for a user to work through.

DETAILED DESCRIPTION, INCLUDING THE PREFERRED EMBODIMENT

Figure 1:
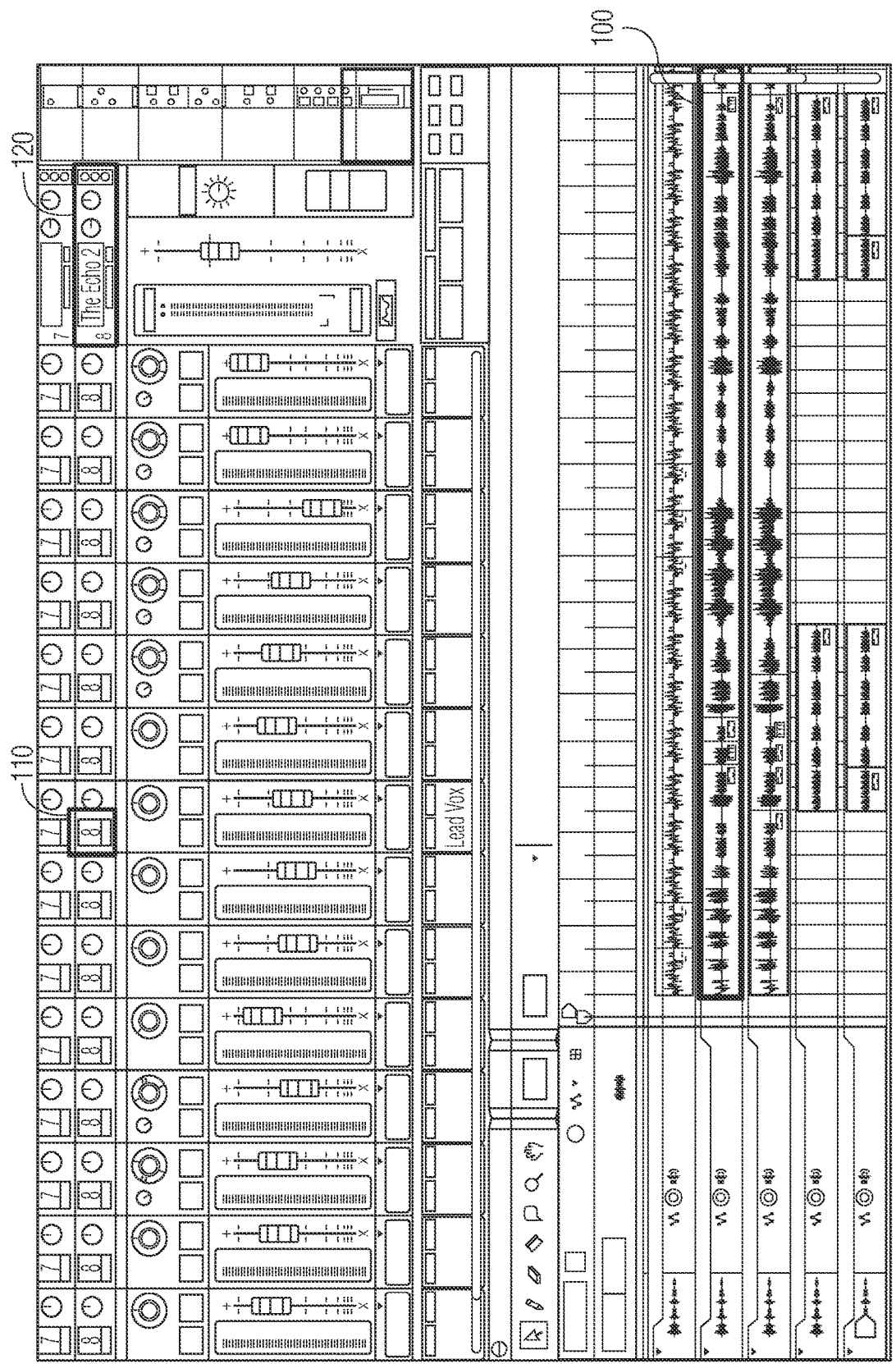
FIG. 1 illustrates a screenshot of a prior art interface of a frequently used DAW program.
Figure 2:
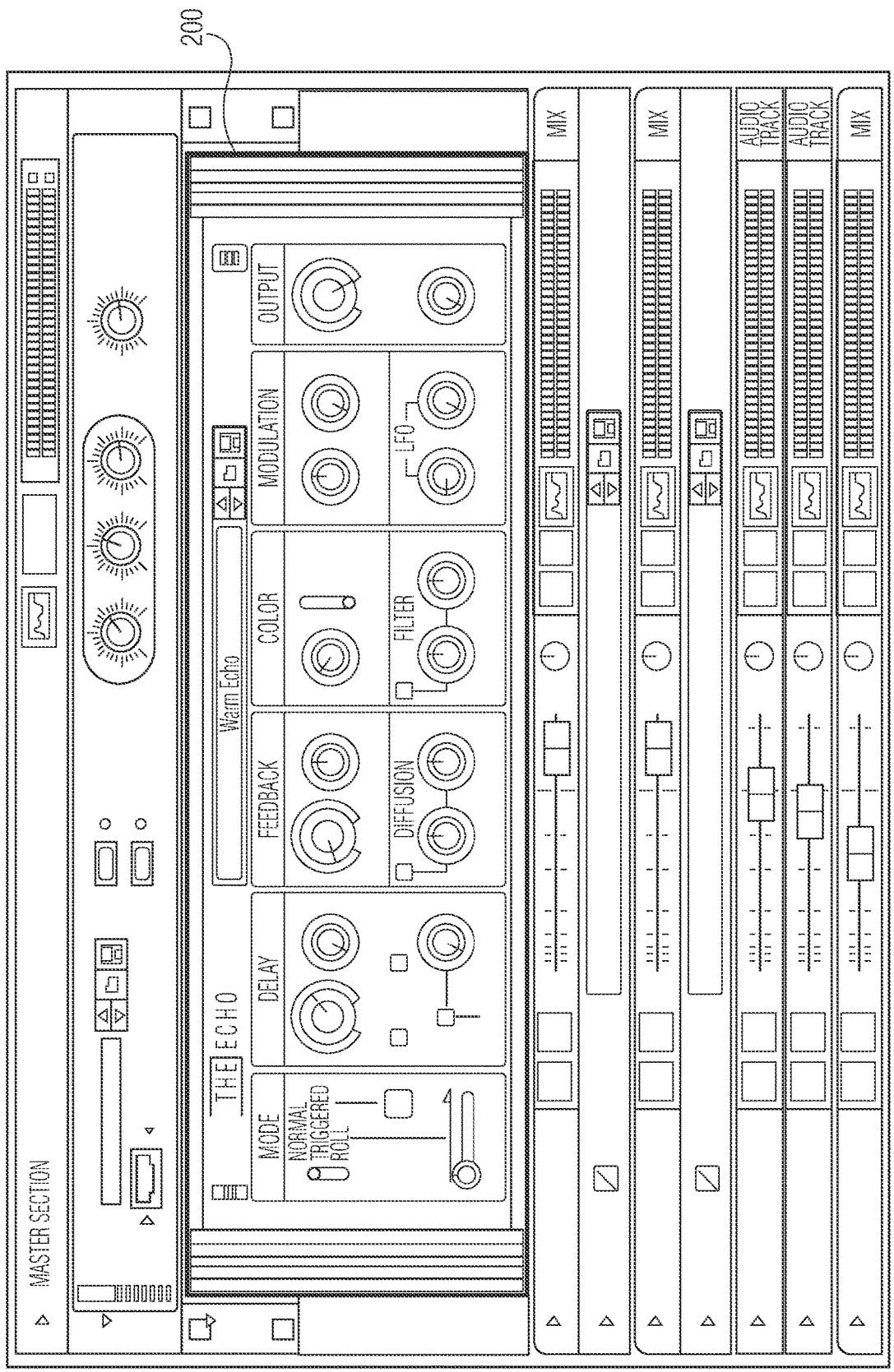
FIG. 2 illustrates another screenshot of a prior art user interface within the same DAW program of FIG. 1.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

A clip is a general component of musical assembly.

Music clips are audio components, either directly playable or generated via MIDI. Music clips are used in the base layer of a song.

Functional clips are applied to underlying music clips and modify them in audio processing, mixing, harmonic, or timing domains. Functional clips are used in upper layers of a song. There are different types of functional clips, such as mix clips, effects clips, key clips, arrange clips, etc.

Mix clips alter audio in the mixing domain—gain, pan, filters, EQ.

FX clips or effects clips alter audio in the audio processing domain—reverb, delay, chorus, distortion, etc.

Key clips alter music in the harmonic domain. Examples: Transposition, Major/Minor Keys.

Arrange clips are utility functions that typically apply numeric or functional transformations. Examples: Octave shift, double or half time.

A compound clip is a music clip bundled with one or more other functional clips (Mix, FX, Key, or Arrange) that contribute to the sonic identity of the music clip.

Indirect music clips are music clips where the contents aren't retrieved directly, but rather from their position in the deck. For example, instead of using a particular recording of drums, use whatever drum music clip is in the first position in the Drums tab of the current deck.

A deck is an organization of musical and functional clips, either assembled by the user or pre-assembled and provided to the user. The deck contains the musical and functional clips available to the user for use in the current song.

A tab is an organization of clips within a deck—tabs typically group the clips of a deck into areas of similar functionality. For example, the "Drums" tab contains music clips that represent different drum samples. The "Mix" tab is an arrangement of functional clips that allow for the mixing of music clips in different ways.

A layer is a set of clips of the same type organized within the user interface. One or more layers consist of music clips. Other layers include various functional clips. The layers are separately addressable axes of musical information or control, which can be applied to multi-track musical content flexibly, efficiently and intuitively.

A stack consists of one or more clips—an underlying music clip and the various functional clips in layers directly above that music clip.

A cell is a single bar for a single track of a song, and may contain a stack of clips. Each cell may inherit a type from the track it is associated with, e.g. Drums, Bass, Instrument, Vocals.

A bar is a set of cells that will be played at the same time when reached during playback of a song. A bar may contain cells of different types, such as drums, bass, instrument, and vocal cells all playing at the same time.

A track is a sequence of cells which will be played over time for a song. Typically each track is assigned a type, such as Drums, Bass, Instrument, Vocals.

A grid is a visual representation of the organization of clips into tracks, bars and layers.

A song is a structure that consists of cells organized with dimensions of tracks, bars and layers. A song is also referred to as a "composition", a "musical composition", a "musical song", or an "editable song". A "playable song" is a non-editable piece of music, such as recorded music, a musical stream, or a song exported into a playable file such as an .mp3 file.

A library is a set of songs.

A block or music block or chunk is a structure that consists of a cell that is a set of potentially ordered clips, organized with dimensions of bars and tracks. A block has a length of bars, and one or more tracks. In addition, it can include all layers, or only select layers. It represents an arrangement of cells from a song, that can be named, repeated, and applied as a group within that song or copied as a group to another song. If a music block is edited, all songs that include that block are updated to reflect those edits.

A key block or key chunk is a block that contains only key clips. They affect only the key clips in the parts of the song where they are applied.

A Loop is the current working area for editing a song. In typical editing mode, the editor loops over the bars in the loop, allowing the user to hear the current section of the song being edited.

Tools permit the generation or performance of musical content in real time. Examples include audio recorder, arpeggiators and synths.

A Created Clip or a Recording Clip captures audio or other musical content generated by the user through the use of a tool.

Goals and Milestones are part of a system to track and reward user activities and accomplishments.

Learning Goals reward progress towards using and understand the toolset. This can include the use of the software program, learning song creation techniques, using harmonic progressions, applying Mix Clips and FX Clips, building, editing and managing decks and tabs.

Creative Goals reward larger user activities including creating complete songs and performances, encouraging the player to make style judgements and develop knowledge about musical form.

Social Goals reward engagement beyond the individual user, including other users in the software platform environment and other users of social networks with whom the individual user may be connected.

Skill Goals reward the user for developing proficiency in navigating the interface and creating content, potentially in real time.

Song Sharing is the ability to make an editable song available to other users. Song Sharing enables other users to copy, edit and refine a shared song. A shared song maintains a revision history of the songs and users who have edited and saved copies of the song.

Social Calls to Action are ways to get users to engage with the software platform and each other. These include song contests, custom deck remix contests or exquisite corpse remix contests.

The Store allows users to purchase or download additional clips, tabs, decks, songs, or other items to extend and enhance their use of the software program. The store may use a combination of actual currency or virtual points for purchases. Items available through the store may be provided by the software platform operator or by other creators. Items may be freely available for download, listed for retail sale or resale.

Operation

An improved digital audio workstation may be implemented as a software program running on a computer system. The computer system may have a processor, memory, storage, user input controls, and an output display. The computer system may also have additional outputs, such as audio speakers and/or audio output connectors, network components such as a wireless network interface and/or wired network connectors, and other input connectors such as universal serial bus connectors, firewire connectors, and/or audio input connectors. The computer system may be a mobile device, such as a smart phone or tablet, a personal computer such as a desktop or laptop, a dedicated computing device within a recording studio, or a server operating locally, remotely, or within a cloud. The computer system may also be multiple computers working together. The computer system components may be included within or directly connected to the computer system, or connected to other devices in communication with the computer system, such as a client device for user interaction in communication with a remote or cloud-based computer system.

The software program applies an underlying organization to a musical song, consisting of cells, containing an ordered stack of clips (from decks containing both music clips and functional clips) and visually editable from different perspectives, including tracks, bars and layers.

Figure 3:
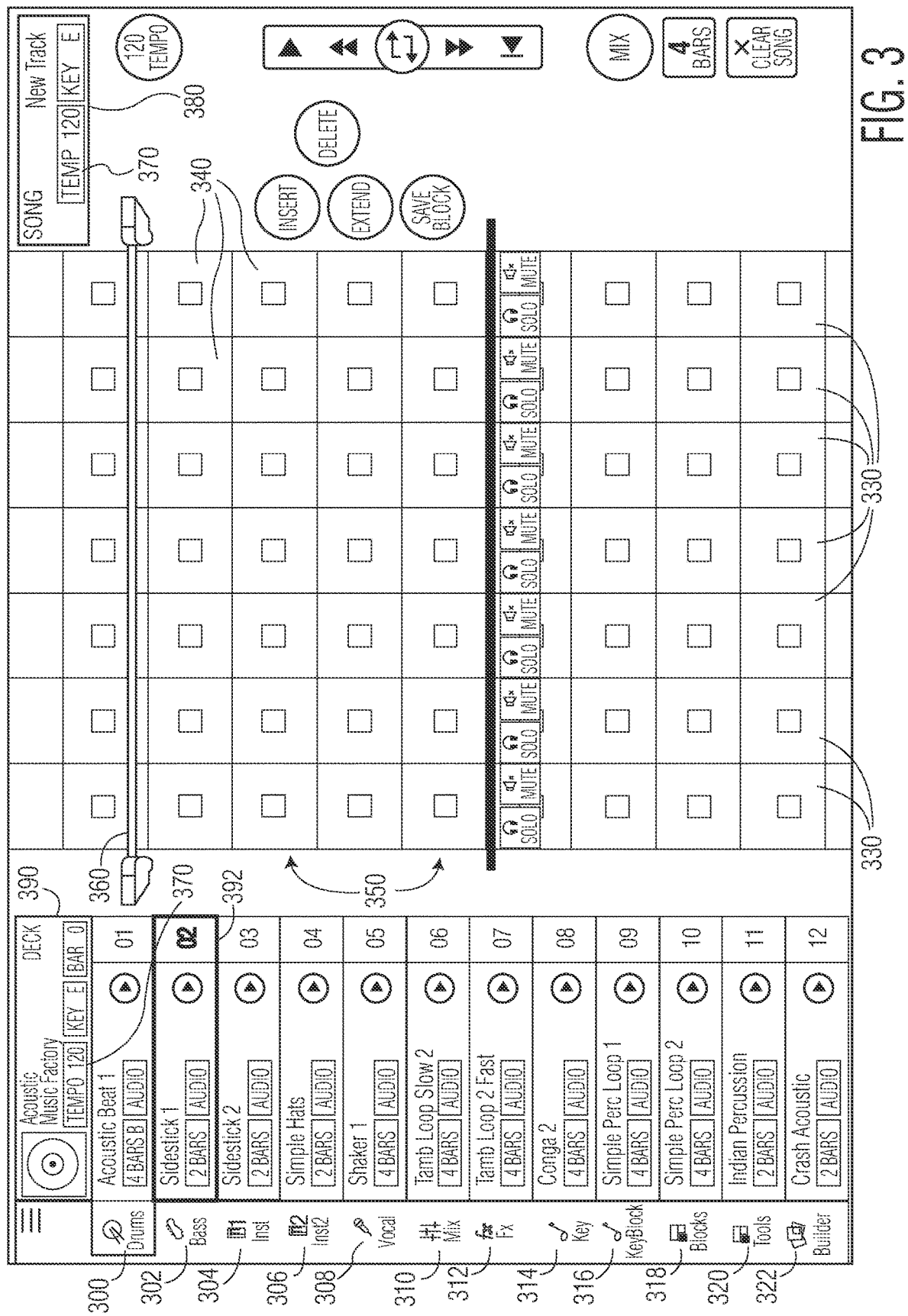
FIG. 3 illustrates a user interface organizing Clips into a tabbed deck and selection of a single Music Clip ("Sidestick 1") and display of related information.

Referring to FIG. 3, operating the software program by the computer system displays a user interface for creating and editing musical songs. The user interface allows users to select music and functional clips available from a deck, and deploy the selected clips to cells within layers of a grid representing the musical song.

The user controls, selects, and edits the song by interacting with the placement and properties of musical and functional clips. The user arranges clips in layers, bars, tracks, and cells. The user provides input using various input mechanisms such as, but not limited to, a touch pad, touch screen, stylus, keyboard, mouse, or a video game controller.

The display of information may either be 2-dimensional (with different layers indicated with various cues such as shading, color, degree of translucence, or position on screen); a 2-dimensional perspective on an underlying 3-dimensional model; or 3-dimensional rendered through virtual reality.

In the illustrated interface, to the left the user has available a number of different tabs of clips as configured for a particular deck. In this example, the first five tabs are groupings of Musical Clips (Drums 300, Bass 302, Inst 304 and Inst2 306 (Instruments), and Vocal 308). The user also has available several tabs of Functional Clips (Mix 310, Fx 312 (Effects), Key 314, and Key Block 316). In a preferred embodiment there are several other features available to the user—Blocks tab 318 allows the user to create and quickly re-apply sets of musical and functional clips grouped together; Tools tab 320 accesses recording or other user-input features; and Builder tab 322 accesses available clips for editing the active deck. Other user interface interaction may reach a Store (a feature for the user to extend the library of musical and functional clips that they have available for use in creating songs), Goals (a feature for the user to view their progress through a journey of learning to create and edit songs and use the application through game mechanics); and a Menu allowing access to additional functions.

The song is created through a multitrack music stream which may be represented as a 2-dimensional or 3-dimensional surface, depicting multiple adjacent streams (or tracks) of musical content playing in parallel. Each track 330 is made of a sequential set of cells of the same type. Each cell 340 contains a stack of clips, ordered to start with a music clip and apply any number of functional clips to that music clip.

In the preferred embodiment, the grid in the central display of the user interface represents a play surface with music stream extending from top to bottom with bars 350 from side to side. Within the user interface, a Play Bar 360 is implemented as a visual plane intersecting the music stream. The music stream moves through the play bar at a velocity determined by the musical tempo 370, which may be configured for the song 380 or the deck 390. As the tracks comprising the music stream intersect with the plane of the Play Bar, the musical content present in the stream plays in real time by playing all stacks across every track in that bar.

Table 1 defines a data structure, implemented as json structures in the preferred embodiment, for users which tracks a number of Clips (both music and functional clips) available for use by the specific user, as well as a number of Decks to use.

TABLE 1

```
// USER:
//
{
  "$schema": "json-schema.org/draft/2019-09/schema#",
  "$id": "tonestone.net/user.schema.json",
  "title": "User",
  "description": "A ToneStone user",
  "version": "0.1",
  "type": "object",
  "properties": {
    "guid": {
      "description": "a global id which uniquely references this User.",
      "type": "string"},
    "name": {
      "description": "Name of the User",
      "type": "string"},
    "email": {
      "description": "Email address for the user",
      "type": "string"},
    "decks": {
      "description": "an array of the decks that this user has created",
      "type": "array",
      "items": {"$ref": "tonestone.net/deck.schema.json"}
    },
    "clips": {
      "description": "an array of all the clips that this user has available",
      "type": "array",
      "items:" {"$ref": "tonestone.net/clip.schema.json"}
    }
  },
  "required": [ "guid" ]
}
```

Table 2 defines a data structure for decks which includes a number of tabs for each deck.

TABLE 2

```
// DECK:
//
{
  "$schema": "json-schema.org/draft/2019-09/schema#",
  "$id": "tonestone.net/deck.schema.json",
  "title": "Deck",
  "description": "A Deck of clips",
  "version": "0.2",
```

TABLE 2-continued

```
  "type": "object",
  "properties": {
    "guid": {
      "description": "a global id which uniquely references this deck.",
      "type": "string"},
    "version": {
      "description": "an id for the version of this deck. Could be integer or guid.",
      "type": "string"},
    "name": {
      "description": "the displayable name of the Deck",
      "type": "string"},
    "tabs": {
      "description": "tabs included in this deck",
      "type": "array",
      "items": {"$ref": "tonestone.net/tab.schema.json"}
    }
  },
  "required": [ "guid", "version", "name"]
}
```

Table 3 defines a data structure for tabs which includes a number of clips for each tab.

TABLE 3

```
// TAB:
// An ordered set of clips in a tab
{
  "$schema": "json-schema.org/draft/2019-09/schema#",
  "$id": "tonestone.net/tab.schema.json",
  "title": "Tab",
  "description": "A Tab in a Deck",
  "version": "0.1",
  "type": "object",
  "properties": {
    "guid": {
      "description": "a global id which uniquely references this tab.",
      "type": "string"},
    "name": {
      "description": "the displayable name of the tab",
      "type": "string"},
    "clips": {
      "type": "array",
      "items": {"$ref": "tonestone.net/clip.schema.json"}
    }
  },
  "required": [ "guid", "name"]
}
```

In the preferred embodiment, a preconfigured set of decks with music and functional clips are provided with the software program. Additional clips or complete tabs or decks may be purchased through a content store and imported by the software program, or directly created and imported by individual users. Decks are provided with an intended set of available tabs, after which individual users may customize or create new tabs within a deck. When provided with a deck, each tab has an initial arrangement of clips which may later be rearranged by the user. Creation, editing, and other customization of tabs and decks may be done with standard user interface control programs.

A user interacts with the user interface to select a specific deck, a specific tab within that deck, and one or more clips within that tab. In the example shown in FIG. 3, a user has selected a single clip 392 (in this case, a "Sidestick 1" musical clip from the Drums Tab). A musical clip may be previewed, in which the software program outputs audio of the clip in context with the song being created, so that the user can hear what the clip sounds like before it is inserted into the song.

Table 4 defines a data structure for Clips as a polymorphic structure that consists of one of a number of types of clips. Principally, a Clip can be a Music Clip or a Functional Clip.

TABLE 4

```
// CLIP:
//
// Other types of clips:
// * Indirect clip - points to a slot of a deck, rather than the Clip guid
directly
// * Display clip - a visual effect that can be displayed
// * Block - a reusable portion of a song
// * Compound clip - music clips + one or more functional clips
{
  "$schema": "json-schema.org/draft/2019-09/schema#",
  "$id": "tonestone.net/clip.schema.json",
  "title": "Clip",
  "description": "A Clip",
  "version": "0.1",
  "type": "object",
  "properties": {
    "guid": {
      "description": "a global id which uniquely references this clip.",
      "type": "string"},
    "name": {
      "description": "Name of the clip",
      "type": "string"},
```

TABLE 4-continued

```
    "type": {
      "description": "The type of the clip",
      "enum": [ "Music", "Functional", "Recording", "Indirect",
"Display", "Compound"]}
  },
  "required": [ "guid", "name"]
}
```

Table 5 defines a music clip data structure including metadata about the clip relevant to placing the clip in tabs and decks, specific performance information about the music clip such as duration and tempo, path or link to an icon or visual representation to display for the clip, and access data such as specific format of the music clip, and path to access the clip. In the preferred embodiment the path is a file path with each clip stored as a file within a file directory, but alternate paths may be used to access clips stored within a database or retrieved across a local or wide area network.

TABLE 5

```
// MUSIC CLIP:
//
{
  "$schema": "json-schema.org/draft/2019-09/schema#",
  "$id": "tonestone.net/music_clip.schema.json",
  "title": "Music Clip",
  "description": "A Music Clip",
  "version": "0.2",
  "type": "object",
  "properties": {
    "guid": {
      "description": "a global id which uniquely references this clip.",
      "type": "string"},
    "OMI id": {
      "description": "an Open Music Initiative ID for this clip",
      "type": "text"},
    "version": {
      "description": "the version of this clip",
      "type": "int"},
    "name": {
      "description": "Name of the music clip",
      "type": "string"},
    "format": {
      "description": "Format of the music clip",
      "enum": [ "Audio", "MIDI/Synth" ]},
    "type": {
      "description": "The type of the clip (typically the tab it would appear on)",
      "enum": [ "Bass", "Drums", "Inst", "Vocals" ]},
    "iconPath": {
      "description": "path to the graphic image used to represent clip",
      "type": "string",
      "pattern": "^(/[^/]+)+$"},
    "musicPath": {
      "description": "path to the music clip file",
      "type": "string",
      "pattern": "^(/[^/]+)+$"}},
    "instrument": {
      "description": "The instrument in the clip",
      "enum": [ "Acoustic Bass", "Acoustic Guitar", "Bass", "Brass", "Cahon", "Clap",
"Conga", "Cymbal", "Darbuka", "Drums", "Electric Bass", "Electric Guitar", "Electronic Beat", "Flute",
"Guitar", "Harp", "Hi Hat", "Kit", "Percussion", "Piano", "Shaker", "Snare", "Strings", "Synth", "Synthetic
Bass", "Tabla", "Tambourine", "Vocals" ]},
    "role": {
      "description": "The role the clip typically plays in a song",
      "enum": [ "Fill", "Beat", "Percussion", "One-Shot", "Effects", "Lead", "Chord" ]},
    "key": {
      "description": "The key the clip is in",
      "enum": [ "C", "F", "B Flat", "E Flat", "A Flat", "D Flat", "G Flat", "C Flat", "G",
"D", "A", "E", "B", "F Sharp", "C Sharp" ]},
    "repeats": {
      "description": "whether the clip typically repeats in the song",
      "enum": [ "Loop", "One-shot" ]},
    "genre": {
```

TABLE 5-continued

```
      "description": "the genre of the song that this clip might be appropriately used in",
      "type": "array",
      "enum": [ "Ambient", "Bass", "Disco", "Drum and Bass", "Dubstep", "EDM",
"Electro", "Electronic", "Electronica", "Experimental", "Film", "Funk", "Future Bass", "Glitch", "Hip
Hop", "House", "Jazz", "Melodic EDM", "Pop", "Reggae", "R&B Soul", "Rock", "Sound Effects",
"Tech House", "Techno", "Trance", "Trap", "Tropical House", "World" ]},
    "tempo": {
      "description": "the number of beats per minute for the clip",
      "type": "integer",
      "minimum": 1,
      "maximum": 500},
    "duration": {
      "description": "the length of the clip in bars",
      "type": "integer",
      "minimum": 1},
    "volume": {
      "description": "the default volume to play the clip in a song",
      "type": "number",
      "minimum": 0,
      "maximum": 1},
    "song source": {
      "description": "the song the clip was sourced from",
      "name": {
        "description": "the name of the song source",
        "type": "text"},
      "artist": {
        "description": "the artist that created the source song",
        "type": "text"},
      "album": {
        "description": "the album that the source song appears on",
        "type": "text"},
      "OMI id": {
        "description": "the Open Music Initiative ID for the source song",
        "type": "text"},
    }
    "required": [ "guid", "name"]
}
```

Table 6 defines a functional clip data structure, including metadata about the clip relevant to placing the clip in tabs and decks, path or link to an icon or visual representation to display for the clip, and access data such as the file path to access the clip. In the preferred embodiment the path is a file path with each clip stored as a file within a file directory, but alternate paths may be used to access clips stored within a database or retrieved across a local or wide area network. In the preferred embodiment functional clips are code modules which are run when applied to a music clip, and may be user controlled by accepting input parameters when deployed into a cell. In an alternate embodiment, the code module for each functional clip may be implemented within the software program, and the clip path used to identify which module to execute.

TABLE 6

```
// FUNCTIONAL CLIP:
//
{
  "$schema": "json-schema.org/draft/2019-09/schema#",
  "$id": "tonestone.net/functional_clip.schema.json",
  "title": "Functional Clip",
  "description": "A Functional Clip",
  "version": "0.1",
  "type": "object",
  "properties": {
    "guid": {
      "description": "a global id which uniquely references this functional clip.",
      "type": "string"},
    "name": {
      "description": "Name of the functional clip",
      "type": "string"},
```

TABLE 6-continued

```
    "OMI id": {
      "description": "an Open Music Initiative ID for this clip",
      "type": "text"},
    "type": {
      "description": "Type of the clip (must be Functional)",
      "enum": [ "Functional" ]},
    "subtype": {
      "description": "The subtype of the Functional clip (typically the tab it would appear on)",
      "enum": [ "Mix", "Key", "Fx", ]},
    "iconPath": {
      "description": "path to the graphic image used to represent clip",
      "type": "string",
      "pattern": "^(/[^/]+)+$"},
    "effectPath": {
      "description": "path to the functional file",
      "type": "string",
      "pattern": "^(/[^/]+)+$"}
  },
  "required": [ "guid", "name"]
}
```

Figure 4:
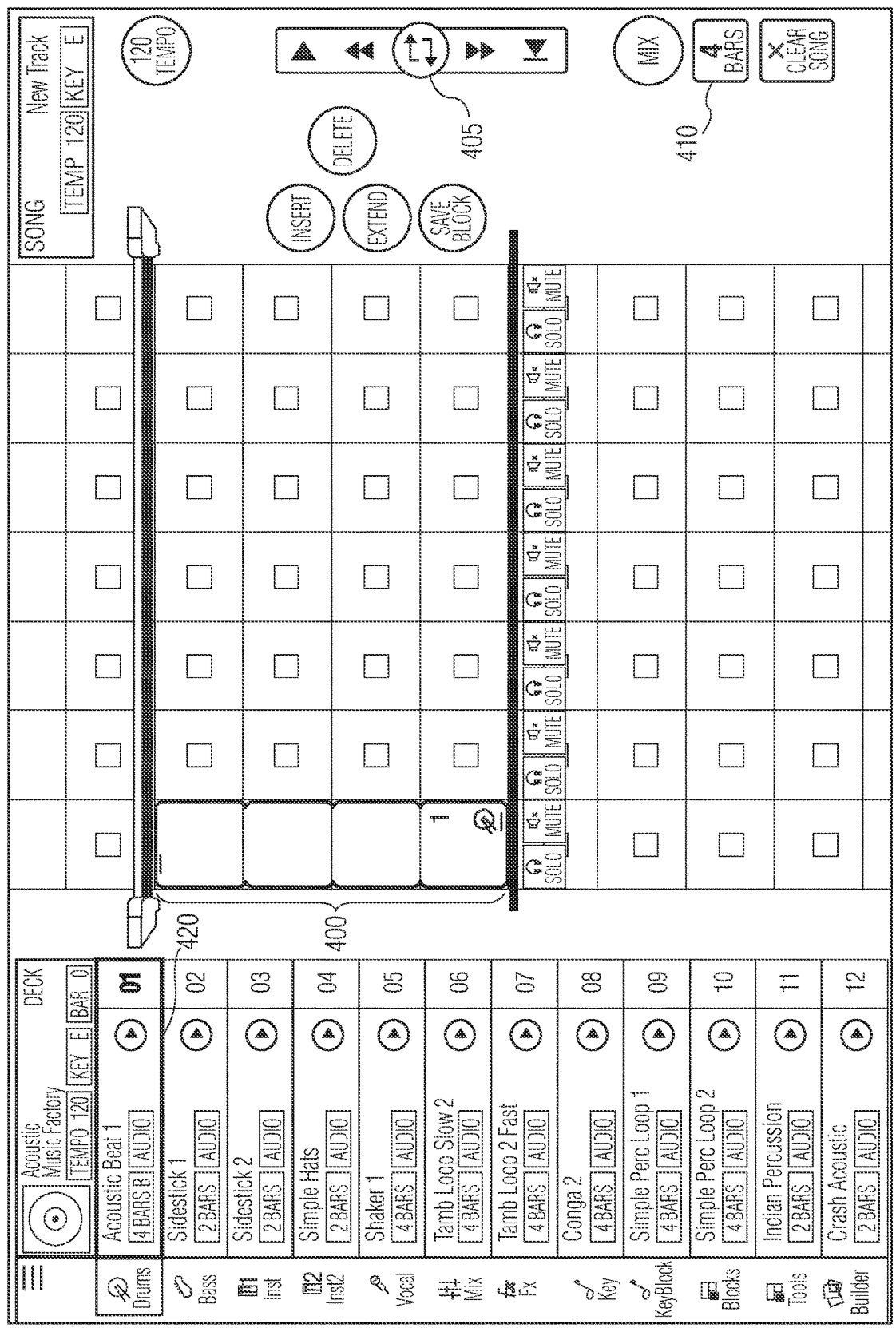
FIG. 4 illustrates the placement of a selected Music Clip upon the track surface within the user interface of FIG. 3.

Referring also to FIG. 4, there is a Loop 400, or identified working area within the overall song. The Loop may be toggled off to view the entire song, or on to work on the identified working area, through user interface control 405 or other standard user interface control methods. The length of this working area is set, and preferably of 1-8 bars but may be of a different length, and may be configured through the user interface such as through control 410. This working area allows music clips and tool clips to be quickly inserted and edited as a section of a song. In the preferred embodiment, the current song with the loop is played continually, allowing the user to hear a subset of the song. As clips are previewed for potential use in a song, they are previewed in musical time synchronized with the current loop.

Figure 5:
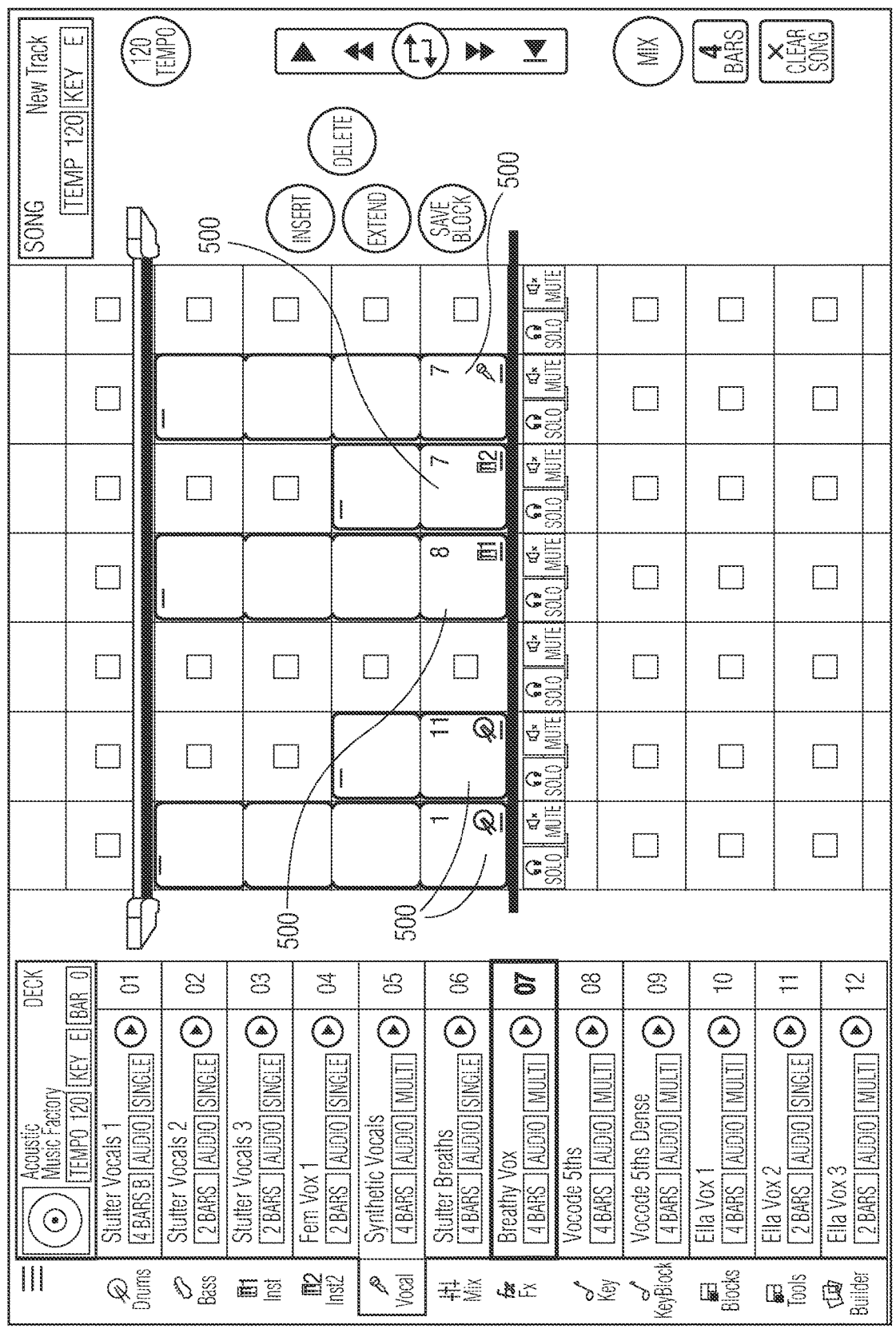
FIG. 5 illustrates multiple Music Clips placed upon the track surface within the user interface of FIG. 3.

As shown in FIG. 4, a different music clip 420 ("Acoustic Beat 1") has been selected and inserted into the song. Insertion may be done by clicking and dragging, clicking on a selection and then clicking on cells within the loop, or through other user interface controls. Users may control how many bars are filled by the clip, or may depend on a clip default, such as a clip with a tempo of four bars upon insertion filling four bars. Users may insert clips into any tracks of the grid, or may be restricted to specific tracks, such as insertion of drums clips into the drums track of the grid. Referring also to FIG. 5, multiple clips 500 may be selected and inserted into the grid. Clips can be repeated as many times as desired, or grouped in chunks to enable rapid grouped insertion. Portions of clips may also be used. A clip may fill multiple bars (for example, 8 bars), and only a portion of the clip (for example, 2 bars) is desired for inclusion. In one implementation, the user may select options and input which portion of the clip to insert when adding the clip. In another implementation, the user may insert the full clip, and then select the portion(s) to remove or the desired portion to keep. In both implementations, the software program may then track an offset location and duration relevant to the desired portion the user has inserted into the song.

Initial song configuration may default to one track for vocals, one track for bass, multiple tracks for drums, and multiple tracks for instrumentals. Users may further configure the tracks, setting which specific type they desire for each track and how many tracks are included in the song. Users may also optionally disable track restrictions, which then allows any type of music clip to be placed into any type of track.

Figure 6:
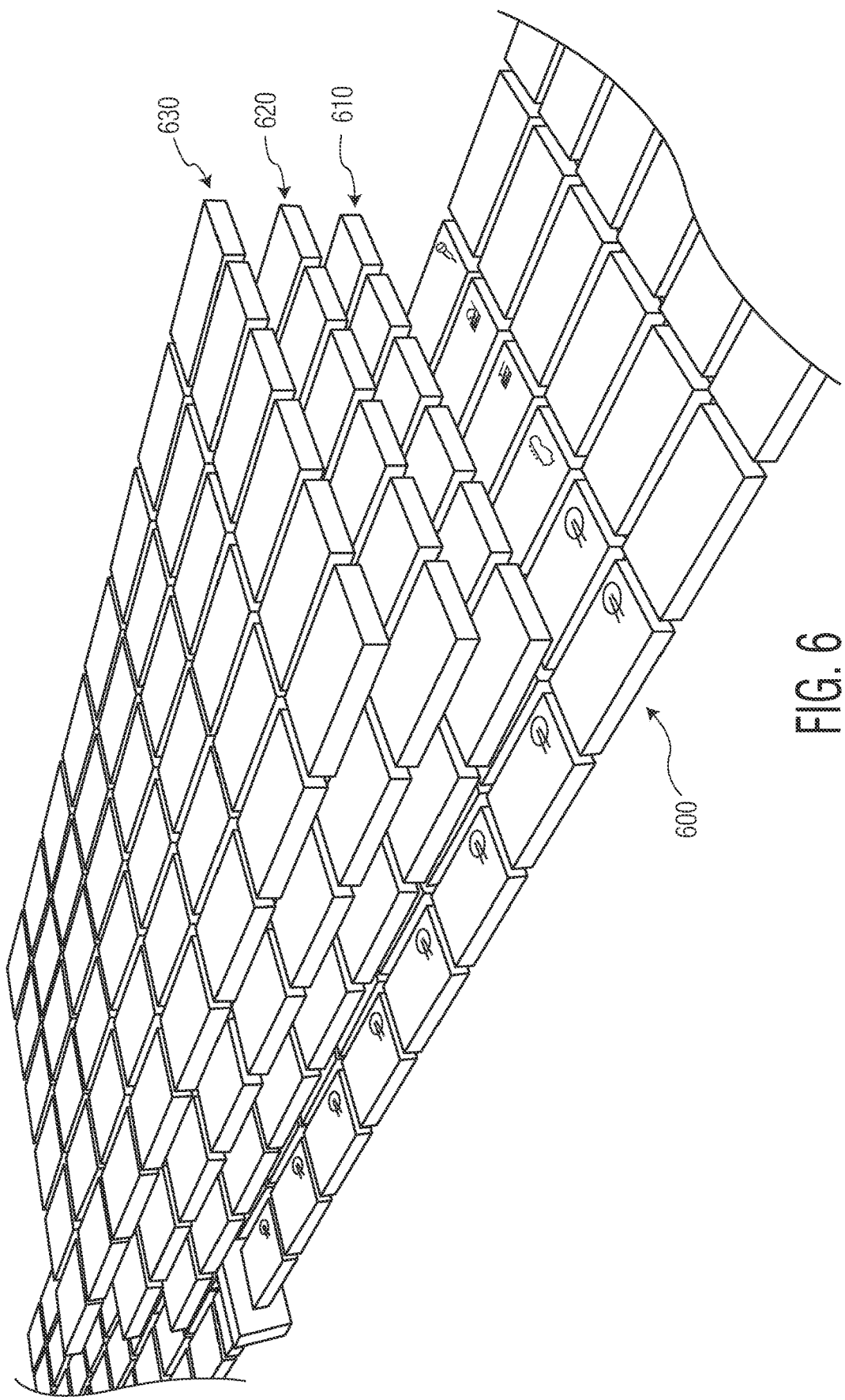
FIG. 6 illustrates a three-dimensional depiction of different Layers.

As illustrated in the user interface, music clips form a base layer within the grid. Also referring to FIG. 6, the grid is three-dimensional and coordinates stacked layers of music clips and layers of functional clips. In this illustration there is a base layer of music content 600 and several additional layers of functional clips—an effects control layer 610 for placing and editing Effects clips, a mixing control layer 620 for placing and editing Mix functions, and a key control layer 630 for placing and editing Key functions.

Different layers are represented by their own functional clip types. These functional clips may be deployed onto the grid, on top of music clips that actually generate the music. In this way, all relevant musical transformations are visible on the same surface at the same time.

In one example, a current functional layer is implemented as a translucent layer positioned over the underlying music clips layer. The representation is in 2-dimensions, but may also be displayed in 3-dimensions. The tracks and bars of the music layer are visible, but there are visual cues (color, shading, position) that the user is working in a separate functional layer. When the user positions a Functional Clip within the current functional layer (corresponding to underlying tracks and bars of music clips), the effects of that Functional clip are applied to the corresponding underlying tracks and bars of music clips at playback.

Figure 7:
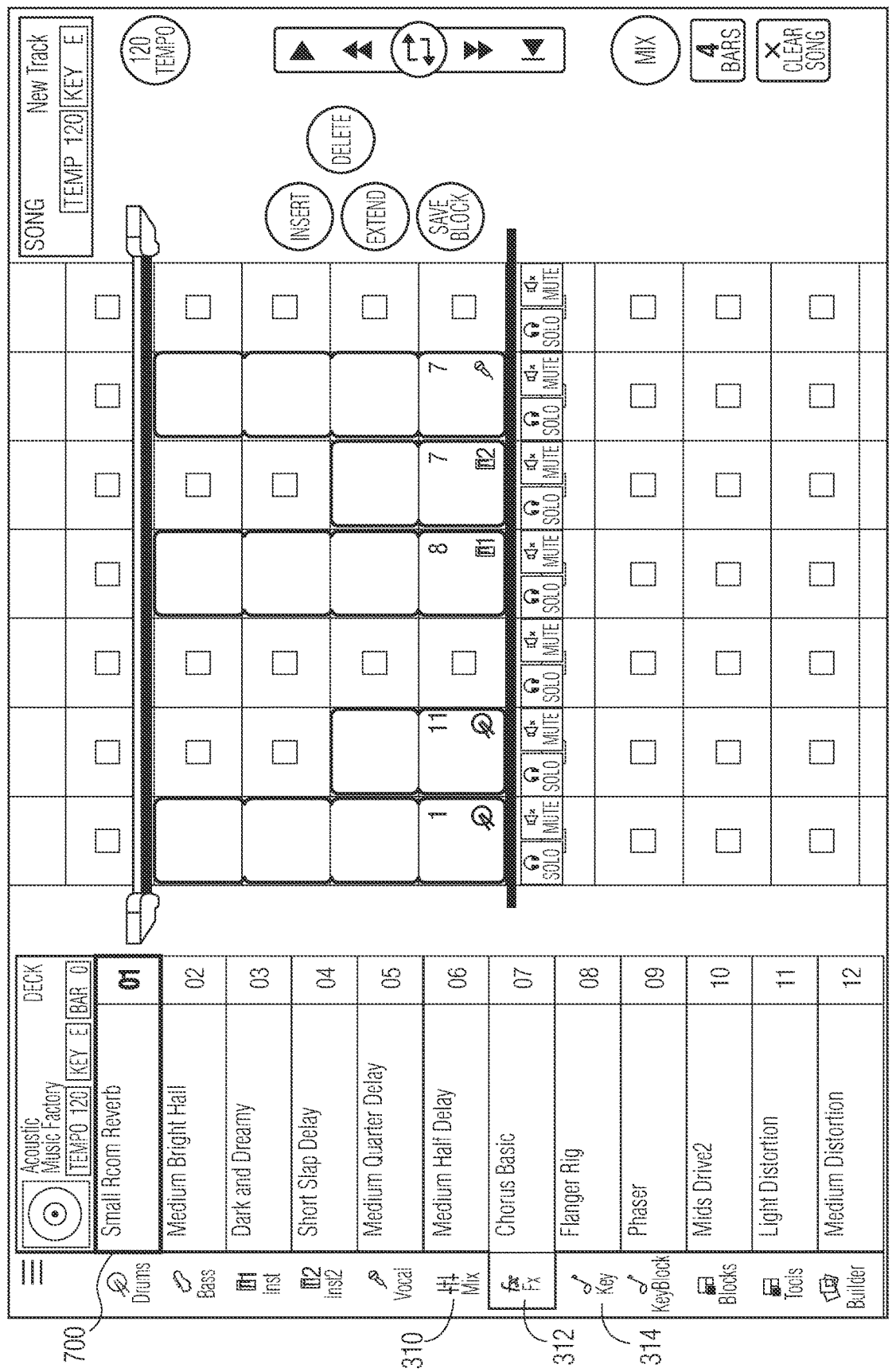
FIG. 7 illustrates use of a tab for selecting control one group of functional clips ("Effects" clips) associated with various sonic manipulations and effects applied to instruments and sounds (such as reverb, echo, or distortion). These functional clips appear on the Effects (FX) control layer within the user interface of FIG. 3.
Figure 8:
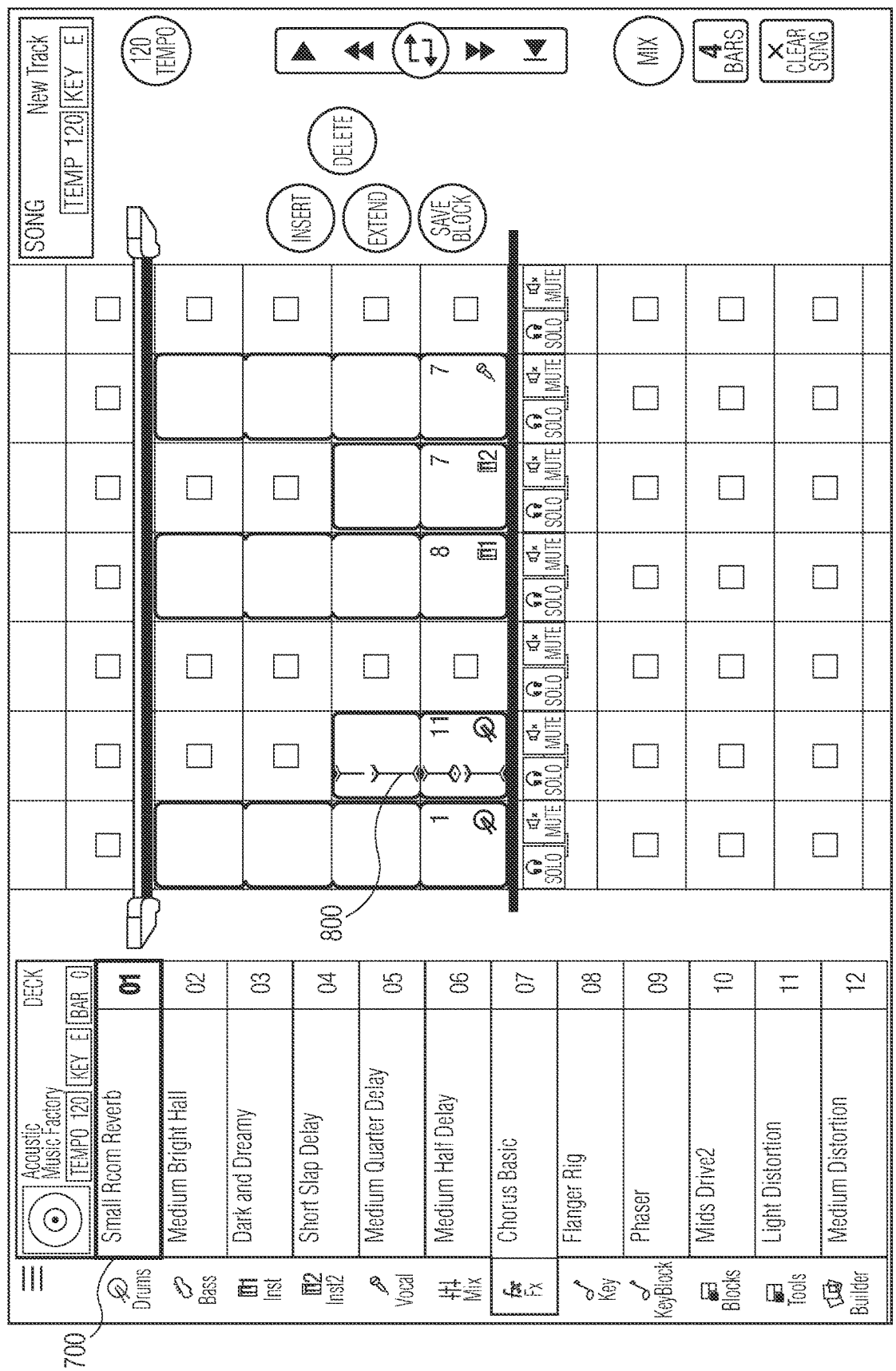
FIG. 8 illustrates the effects clip (Small Hall Reverb) selected in FIG. 7 placed on a single track (track 2), in the Effects layer.
Figure 9:
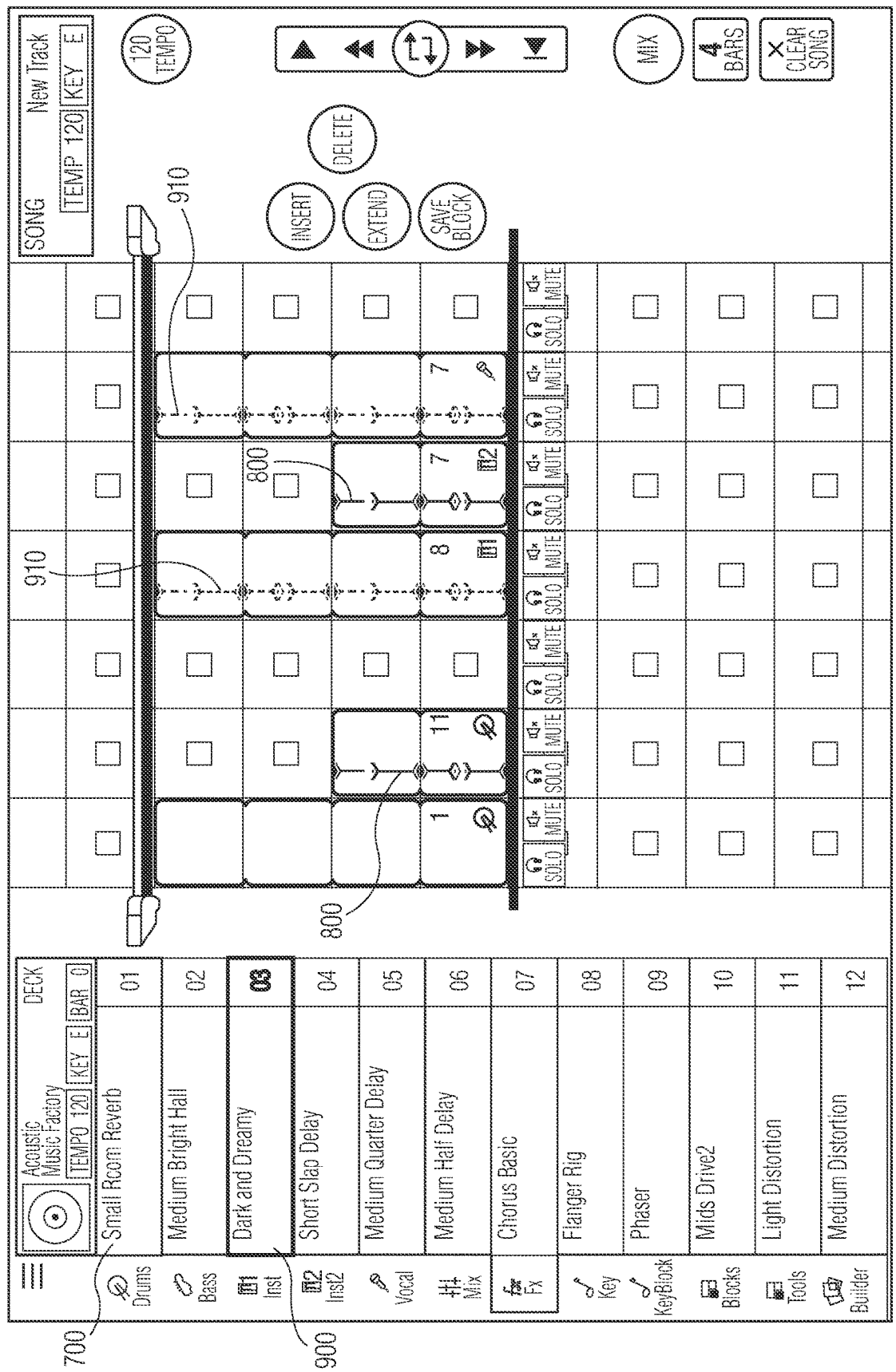
FIG. 9 illustrates another effects clip (Dark and Dreamy) selected and placed on multiple tracks (tracks 4 and 6), in the Effects layer.

Referring also to FIG. 7, functional clips are accessed through the tabs for Mix 310, Fx 312, and Key 314. In the illustrated example, a "Small Room Reverb" Effect Clip 700 is selected. Referring also to FIG. 8, when the selected functional clip 700 is applied (through mouse clicks or other user interface control) to one or more clips within a track, the grid representation of the song in progress illustrates this by overlaying a graphical icon 800 associated with the functional clip over part of the graphical display of each music clip. Specific layers may have configurable border highlights or color tints providing indication to the user of which specific layer is being modified. As illustrated, a preferred embodiment maintains a 2-dimensional grid representation within the user interface, but alternate 3-dimensional grid representations may also be used. Referring also to FIG. 9, the same clip 700 and icon 800 or different functional clips, such as effect clip 900 with icon 910, of the same type may be applied to multiple clips and tracks within the same layer.

Figure 10:
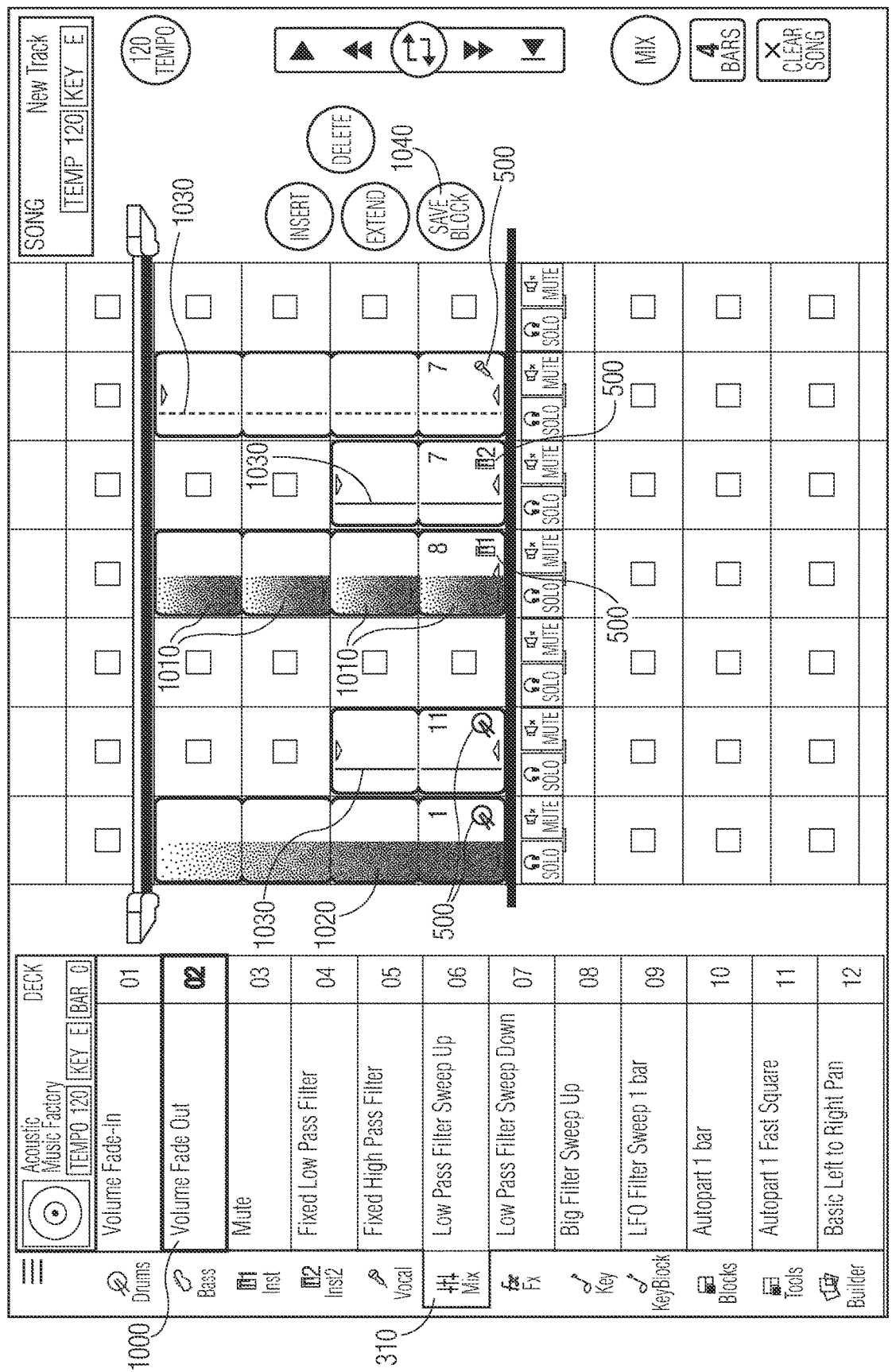
FIG. 10 illustrates shows a Mix Clip (Volume Fade Out) placed on multiple tracks (tracks 1 and 4), in the Mix layer.

Referring also to FIG. 10, selecting a tab for a different layers alters the user interface to provide user indication of which layer is active for current clip additions, deletions, or edits. For example, selecting the Mix tab 310 provides access to functional clips of an Audio Mixing domain, allowing adding and editing different Mix functional clips that will have an impact on the underlying Music Layer. Adding mix clips, such as clip 1000, may be applied individually per cell 1010, in which case the effect is removed and restarted each cell, or across multiple cells (1020), in which case the effect is continuously applied across the multiple cells. As the mix layer is a different layer from the effects layer, the effects from the effects layer still exist and are visually represented where possible with graphics 1030 which indicates existence on a non-active layer. Within the preferred 2-dimensional grid display, this enables a user when working within one Layer to have visibility of other Layers for context. In particular, when working in a functional layer, the user can view the graphical representation of underlying clips 500 in the Music Layer.

While working on a song, the user interface may present playback controls. When a user begins playback, the software program generates audio playback one bar at a time. When generating the audio for the underlying song representation of a bar, the software program first gathers the set of music clips that are to be played (either initiated, repeated, or continued). In the preferred embodiment, each of these music clips represents an audio track. For each music clip, the ordered stack of functional clips is evaluated and applied by the software program before generating the audio output. The resulting audio is then played (output) to the user. This is detailed programmatically in Table 7.

TABLE 7 for each Track in the Song:
  for each Bar in the Track:
    for each Clip in the Bar:
      if (Clip is a Music Clip){
        locate the location and duration within the clip to play and set that as the base audio
      }
      else if (Clip is a Functional Clip){
        apply its effect to the current base audio and set the result as the new base audio
      }
  Collect the results of processing;
  Generate audio output by playing all the tracks in parallel, bar by bar;

Note that the structure for saving a song that consists of clips (musical and functional) arranged in tracks and bars may be stored differently from their visual representation in the layers interface. The layers interface isolates a set of clips, allowing the user to work with them separately, but in context and alignment with the other components and layers of the song. A song may be stored with its components organized differently—as tracks over time or as bars that consist of multiple tracks to be played in parallel. The song may also be converted into an audio stream as a fully mixed song in a standard audio format, such as a .wav or .mp3 file, and played or stored in that format.

Table 8 defines a data structure representing individual tracks including an ordered array of musical clips and layers of functional effects to be applied.

TABLE 8

```
// Track:
// Includes layers of clips.
// Clips are applied in order, so typically the music clip would be first,
then 0 or more functional effects
//
{
  "$schema": "json-schema.org/draft/2019-09/schema#",
  "$id": "tonestone.net/track.schema.json",
  "title": "Track",
  "description": "A track within a song",
  "version": "0.1",
  "type": "object",
  "properties": {
    "guid": {
      "description": "a global id which uniquely references this track.",
      "type": "string"},
    "type": {
      "description": "The type of track",
      "enum": [ "Bass", "Percussion", "Vocal", "Instrument",
        "Display"]},
    "layers": {
      "type": "array",
      "items": {"$ref": "tonestone.net/clip.schema.json"}
    }
  },
  "required": [ "guid" ]
}
```

Table 9 defines a data structure representing individual bars including a set of musical and functional clips to be played at a single time.

TABLE 9

```
// BAR:
// A series of cells that will be played during the same period of
time during a song
// The cells are organized by type in the same order
//
{
  "$schema": "json-schema.org/draft/2019-09/schema#",
  "$id": "tonestone.net/bar.schema.json",
  "title": "Bar",
  "description": "A Bar within a song",
  "version": "0.1",
  "type": "object",
  "properties": {
    "guid": {
      "description": "a global id which uniquely references this bar.",
      "type": "string"},
    "tracks": {
      "type": "array",
      "items": {"$ref": "tonestone.net/track.schema.json"}
    }
  },
  "required": [ "guid" ]
}
```

Table 10 defines a data structure representing a song which may include a set of bars. Alternately, the song could be stored as a set of coordinated Tracks, or as a set of coordinated Layers.

TABLE 10

```
// SONG:
//
{
  "$schema": "json-schema.org/draft/2019-09/schema#",
  "$id": "tonestone.net/song.schema.json",
  "title": "Song",
  "description": "A Song",
  "version": "0.1",
  "type": "object",
  "properties": {
    "guid": {
      "description": "a global id which uniquely references this song.",
      "type": "string"},
    "version": {
      "description": "an id for the version of this song. Could be integer
        or guid.", "type": "string"},
    "name": {
      "description": "Name of the Song",
      "type": "string"},
    "creator": {
      "description": "Who created the song (User guid)",
      "type": "string"},
    "creation_date": {
      "description": "The date the song was created",
      "type": "string"},
    "deck": {
      "description": "The deck the song was created from (Deck guid)",
      "$ref": "tonestone.net/deck.schema.json"},
    "bars": {
      "description": "ordered array of bars in the song",
      "type": "array",
      "items": {"$ref": "tonestone.net/bar.schema.json"}
    }
  },
  "required": [ "guid", "version", "name" ]
}
```

Blocks or chunks may be used as macros for copying and applying sub-pieces of a song. One simple use is to simply make another copy of four bars, for example, as a chorus of the song. As a more complex use, a block may be used to copy only several tracks (e.g., a block might include four bars of only the drums and bass of a song) or only functional effects clips (e.g., copy the FX and Key clips from specific bars for use at another point in the same song). Users may configure blocks by selecting portions of one or more layers within the grid. When applied, a block may replace all underlying contents of the current song, or selectively, only some of the current contents.

In a preferred embodiment, users can create blocks based on the current contents of the Loop, such as through user interface control 1040. These blocks are named and available for reuse with the song.

Figure 11:
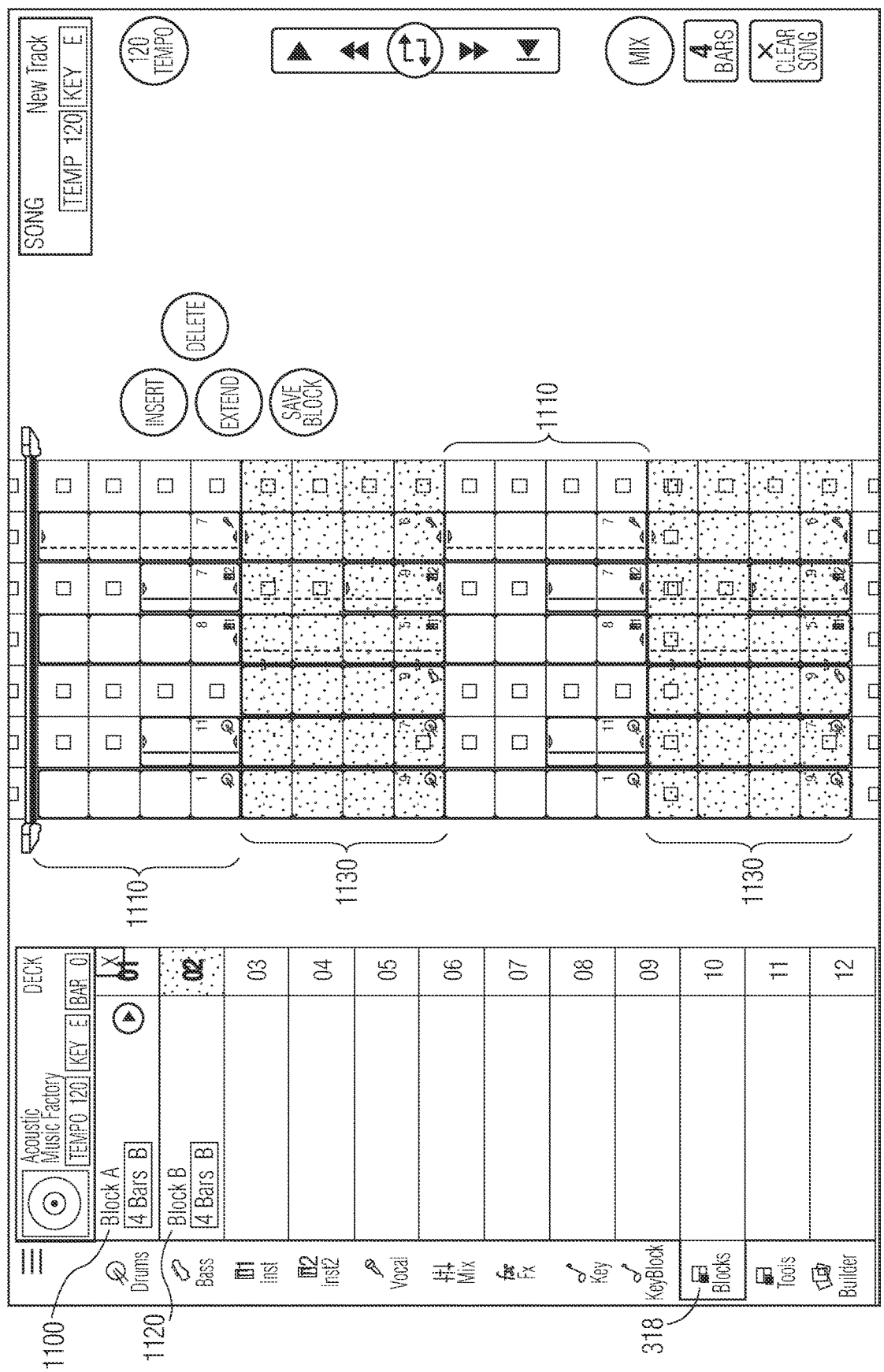
FIG. 11 illustrates use of Blocks.

Referring also to FIG. 11, in a preferred embodiment users can enter a mode through tab 318 in which blocks may be applied to the current song and moved within the song. The Loop as seen in FIG. 10 is saved as "Block A" 1100, which may be dragged for insertion anywhere in the song, such as in sections 1110. A second block 1120 has been created and inserted in positions 1130 between and after Block A. Any number of blocks may be created, inserted, repeated, and moved within the song. Users can edit and save changes to an existing block. Modifications made to the block may be applied to all of those locations within the song where the block is used.

The software program may communicate across a network, such as the Internet, with a software platform or service operated on one or more servers or within a cloud computing environment. The software platform may be accessed by multiple users separately running the software program, and provides a way to exchange content. The software platform may maintain a database and/or file storage to track and distribute songs, clips, and decks among users. The software platform may also manage and enforce ownership rights as configured by creators. Some songs, decks, and clips may be freely available to all users, while others may be available for purchase, such as through a Store operated by the software platform. Other restrictions, such as availability to only specific users or limitations to the total number of copies available, may be applied. Access to the software platform features, such as the Store, may be through the software program, or through separate applications such as web browser access. User accounts may be maintained by the software platform to track individual users and connect separate application activities, such as Store purchases, to the same user account when operating the software program. The software platform may provide cloud storage for all songs, decks, and clips created through the software program such that each user may access the same content when running the software program even if operating on different computing devices. The software platform may also connect with other social media platforms to provide integrations for users to announce, discuss, and distribute songs and other content created within the software program.

Figure 12:
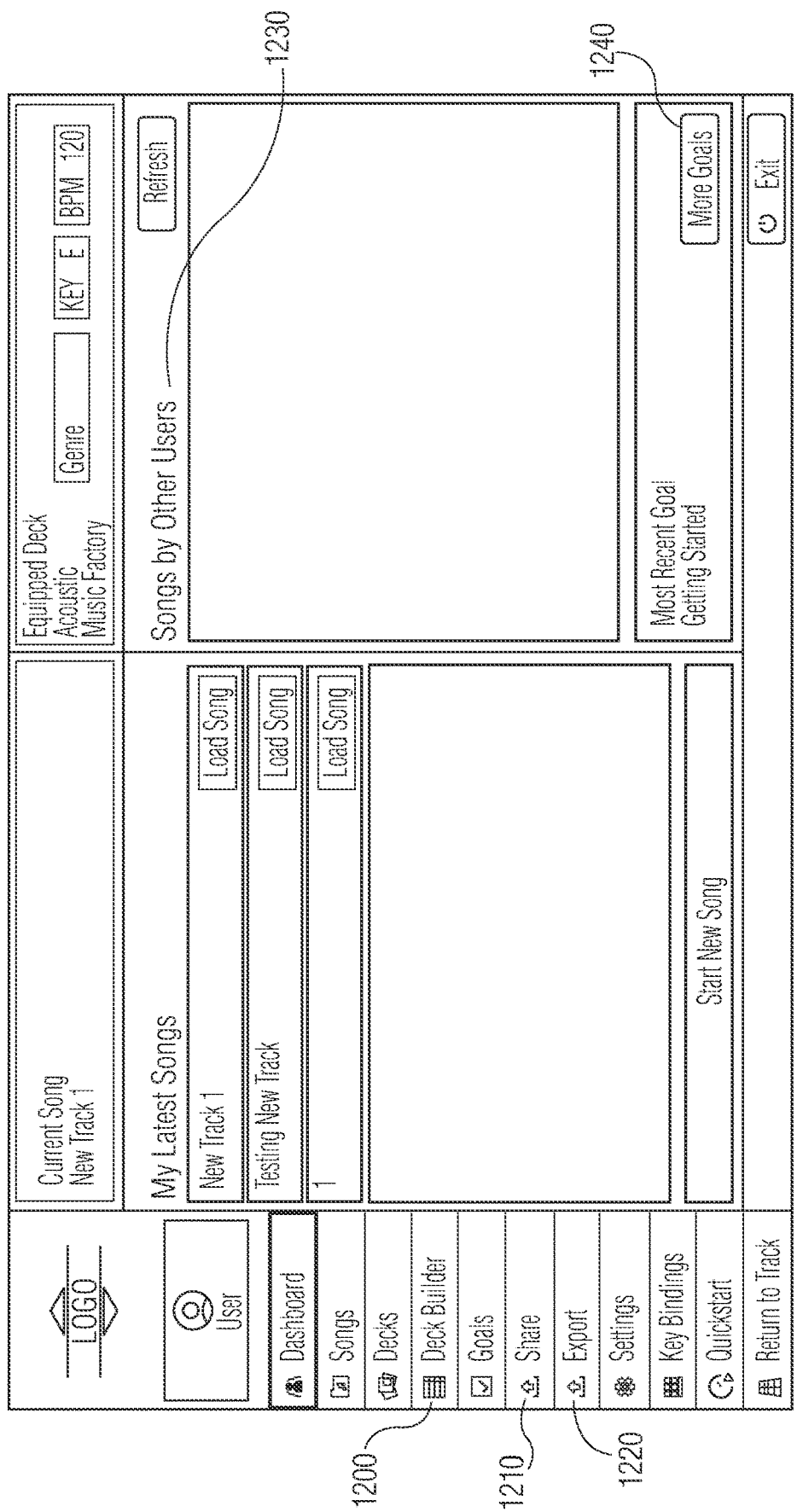
FIG. 12 illustrates dashboard user interface controls including sharing, exporting, and accessing other users' content.

Referring also to FIG. 12, the software program may include a default library of clips and decks for users. These clips may be provided by the software platform operator, created by the user through the use of tools or recording, or downloaded or purchased from the Store. Clips may be purchased or downloaded individually or in assemblages of tabs, decks, or songs. In addition, users may create, edit, and save decks through a deck builder tool 1200, including adding, replacing or deleting clips from an existing deck, or adding clips from the user's library of available clips.

When clips are inserted into a song, they may be inserted directly, in which case the song directly accesses a file storing the applicable clip, or as indirect clips. Indirect clips reference a specific ordered position within a specific tab of a deck. When playing the song, the software program accesses the specific ordered position of the deck to obtain the file path to the applicable clip. Users may then swap to a different deck, and all indirect clips within the song are directed to the clips in the specific ordered position within the different deck. Instead of swapping the entire deck, users may swap tabs, or insert (or change the ordering of) individual clips within a tab. This allows user experimentation, such as swapping the drum tab to a drum tab from a different deck (or any other tab) to see what a song sounds like with different drums (or what clips are in the swapped tab).

To create their own music clips, users may sing or play an instrument into a microphone or capture the digital output of an electronic instrument. Users may also create their own Recording Clips by using a Tool such as a synth or an arpeggiator, or through the use of MIDI capture, using a MIDI controller (external or a model interface built within the software program) and a softsynth or other to provide sonic output. These user-generated clips may be used like any other music clips, used for their own songs or shared or sold with other users for use in their own songs.

The software platform may track the ownership of a Recording Clip on behalf of the User to facilitate copyright tracking. The copyright for a clip is typically owned by its creator. In making a clip available for download or purchase in the Store, its creator is providing a license for users to use that clip within the software program for songs and audio versions of songs. The user can view the copyright ownership and license terms for a clip.

The user can share 1210 any user created or edited songs through the store of the software platform or through other sharing mechanisms such as social media. When sharing, the user may set specific restrictions. These restrictions may include the shared song being free or available for purchase at a specific price. They may include restrictions to specific users or groups of users, or specific limits on sale or use. A user may also specify license/rights under which a song is available and for which it may be used. These specific restrictions are set using user interface input controls in the software program when sharing through the software platform, and are tracked and enforced by the software platform.

In addition to sharing an editable version of a song, users may share an audio version or audio sample. This may be accomplished through the software program creating a file in audio or visual format, such as MP3 or MP4. These files may be exported 1220 for use outside of the software platform, distributed through any social media networks linked to the software platform, or transferred to a music streaming or music distribution service connected to but separate from the software platform. Additionally, the export file may be watermarked or registered on behalf of the user. Another sharing option for a song is as a link within the software platform. Other users may access the link through their software program to obtain the playable song. This allows playing the song through the software program without distributing it as an editable song.

In addition to sharing or exporting the song, clips, tabs, or decks, a user may broadcast or otherwise share the process of creating a song as a performance.

In addition to sharing or exporting songs, users can view and/or preview songs 1230 that have been made available for them through the software platform such as by other users. A user may view the history of a song, including other users who have edited and shared versions of the song. A user may view the components of the song, and the ownership/rights/license associated with each. License permitting, a user may make a copy of a shared song for their own editing and modification. A user may further interact with other users by previewing their songs, downloading and editing their shared songs, reviewing and commenting on their accounts and individual songs. A user may have a list of favorite users or favorite songs.

Figure 13:
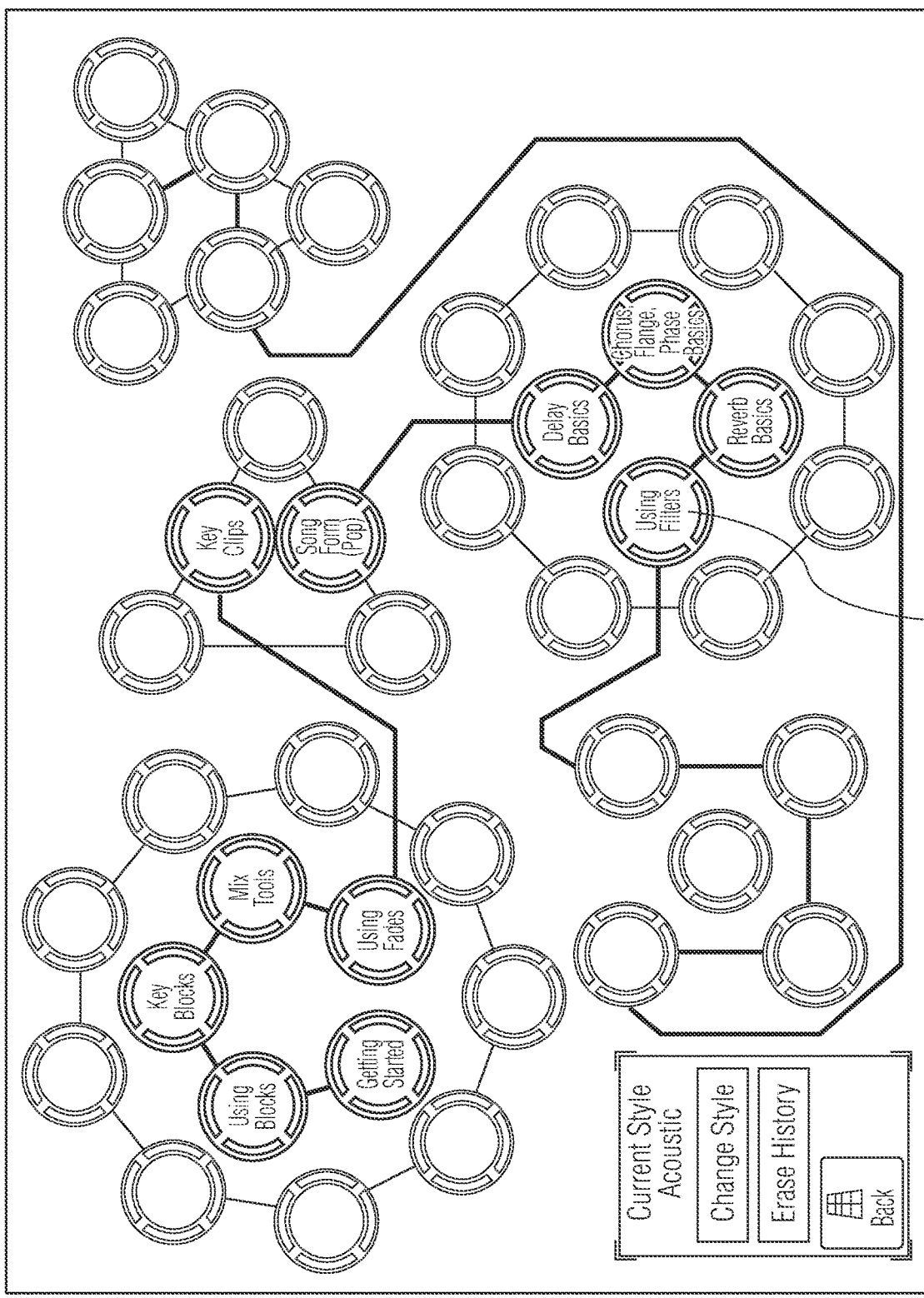

In addition to song creation, users may be presented with goals 1240 to encourage interaction. Referring also to FIG. 13, these goals may be presented externally to the user experience (as a map or journey of goals to be accomplished) or may be presented as part of the usage of the software program. Some goals, such as "Using Filters" goal 1300, may be connected with training modules teaching general use or specific features of the software program. Rewards, such as points, badges, or other gamification techniques may be earned through goal achievement, regular interactions, sustained interactions, software program usage, or social sharing activities. Contests, challenges, or calls to action may interoperate with the goal and reward system. These may be configured through the software platform and appear within the software program, or be external such as organized on social media or through email. Participation may result in rewards such as cash, points, or other recognition such as badges or leader boards.

OTHER EMBODIMENTS

In an alternate embodiment, the software program presents textual tracks that may be used to associate words to be displayed, synchronized by measure. This may be used to allow the user to sing the lyrics to the underlying song, or to explain the meaning of the underlying song in synch with the playback of the song.

In an alternate embodiment, the software program presents a track or layer that represents the visual display to accompany the song. This may be recorded or generated images or video. This may be used to create a "music video" of the song, or to generate a display that accompanies the playback of the song.

In an alternate embodiment, the software program presents a visual representation associated with each clip. The set of visual representation may be combined to create an automated display to accompany the playback of the song.

In an alternate embodiment, the user controls zero or more tracks of the song, while computer generated (such as through artificial intelligence techniques) tracks are used to create and fill one or more additional tracks.

In an alternate embodiment, multiple users can collaborate to create and edit a song, each controlling one or more tracks. This collaboration may be enabled across time or location.

In an alternate embodiment, multiple users can collaborate to create or playback a song, with different users controlling different layers of the song. For example, one user may control the Mix layer, while others individual tracks of the Music Layers and Effects Layers.

In an alternate embodiment, the underlying structure of a Library (set of songs) may be analyzed using data science techniques to identify or cluster related or similar songs.

In an alternate embodiment, the underlying structure of a song may be analyzed using data science or artificial intelligence techniques to evaluate the quality or completeness of a song and make suggestions as to how the song could be improved or to identify steps required to complete the song.

In an alternate embodiment, the application may be presented as a video game, to enable the user to play a character creating and performing songs, or to compete against other players in creating or performing songs.

In an alternate embodiment, users may create their own functional clips for use within the software, applying innovative audio effects to underlying music clips. These user-generated functional clips may be used like any other functional clips, and may be shared or sold with other users.

In an alternate embodiment, a playback software may be distributed allowing songs created by the multi-layer song software to be played or edited from within other environments, allowing sharing created songs in their native format with other editing, broadcast, or distribution software platforms.

The above alternate embodiments may be implemented separately or in any combination with other alternate embodiments and the preferred embodiment.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A software implemented digital audio workstation comprising a computer system operating code stored on a tangible non-transitory medium, the code comprising instructions to:

display a user interface for creation and editing of songs;
within the displayed user interface, display multiple tracks in a music clip layer, each track comprising one or more music clips and each track aligned side-by-side with the other tracks;
within the displayed user interface, display one or more functional layers above the music clip layer, each functional layer comprising one or more functional clips of a type associated with the functional layer;
restrict each music clip to placement within a specific track such that a type of the music clip matches a type of the specific track;
designate at least one track for drums music clips, at least one track for bass music clips, at least one track for instrumental music clips, and at least one track for vocal music clips;
display multiple tabs organizing music and functional clips, including:
  at least one tab organizing drum music clips and associated with the music clip layer,
  at least one tab organizing bass music clips and associated with the music clip layer,
  at least one tab organizing vocal music clips and associated with the music clip layer,
  at least one tab organizing instrumental music clips and associated with the music clip layer,
  at least one tab organizing effects functional clips and associated with an effects functional layer,
  at least one tab organizing mixing functional clips and associated with a mixing functional layer, and
  at least one tab organizing key functional clips and associated with a key functional layer;
organize clips within each displayed tab sequentially;
track the tabs and sequentially organized clips as a deck;
display the organized sequence of clips in one selected tab;
display a graphical identification of all clips in the layer associated with the selected tab;
display a graphical identification of each music clip in the music clip layer;
insert a music clip selected from one of the tabs organizing music clips into one of the multiple tracks in the music layer;
insert a functional clip selected from a tab organizing effects functional clips into the effects functional layer;
insert a functional clip selected from a tab organizing mixing functional clips into the mixing functional layer;
insert a functional clip selected from a tab organizing key functional clips into the key functional layer;
maintain a reference between each clip in the music layer and functional layers to a specific tab and sequence position for that clip;
create a new music clip through a microphone recording or arpeggiator;
connect to a software platform and access a store for download and/or purchase of one or more available clips, tabs, decks, and/or songs;
store a file path to an audio file for each music clip;
store a file path to a file containing a code module for each functional clip;
generate cells by executing the code module of each functional clip of each functional layer while outputting audio from the audio file of the music clip of the music layer directly under the functional clips;
generate bars of music from all side-by-side cells;
group multiple bars into a block;
store the block as a named block;

repeat the named block within the song;
receive user input creating a change to one or more of clips within the named block;
replicate the change within all repetitions of the named block within the song;
generate a song by ordering the generated bars from a beginning of the multiple more tracks to an ending of the multiple tracks;
in response to a user switching the deck to a different deck, generate the song using the clips of the different deck in the same tabs and sequence position as referenced;
export a file of a playable song from the generated song;
upload created content including the generated song and/or the new music clip to the store, cloud storage, or social media sites;
configure license rights for use and distribution of the uploaded content, including at least one of:
　a purchase price for other users of the software platform to acquire the uploaded content,
　a restriction to specific users of the software platform or specific groups of users of the software platform that may acquire the uploaded content,
　a limit to the number of purchases or downloads of the uploaded content by other users of the software platform;
download, from the store, cloud storage, or social media sites, an available song created by another user of the software platform;
display layers of clips of the available song on the multiple tracks;
display a history of the available song, including identification of users of the software platform that have edited the available song and other versions of the available song;
display goals achievable to the user interacting with the displayed user interface;
connect training modules to one or more of the achievable goals;
connect contests operated across the software platform to one or more of the achievable goals;
track completed goals to an account of the user at the software platform; and
display badges or points rewarded by the software platform for completed goals.

2. A software implemented digital audio workstation comprising a computer system operating code stored on a tangible non-transitory medium, the code comprising instructions to:
display a user interface for creation and editing of songs;
within the displayed user interface, display multiple tracks in a music clip layer, each track comprising one or more music clips and each track aligned side-by-side with the other tracks;
within the displayed user interface, display one or more functional layers above the music clip layer, each functional layer comprising one or more functional clips of a type associated with the functional layer;
generate cells by applying each functional clip of each functional layer to the music clip of the music layer directly under the functional clips;
generate bars of music from all side-by-side cells;
generate a song by ordering the generated bars from a beginning of the multiple more tracks to an ending of the multiple tracks;
restrict each music clip to placement within a specific track such that a type of the music clip matches a type of the specific track; and
designate at least one track for drums music clips, at least one track for bass music clips, at least one track for instrumental music clips, and at least one track for vocal music clips.

3. The software implemented digital audio workstation of claim 2, wherein the code further comprises instructions to:
group multiple bars into a block;
store the block as a named block; and
repeat the named block within the song.

4. The software implemented digital audio workstation of claim 3, wherein the code further comprises instructions to:
receive user input creating a change to one or more of clips within the named block; and
replicate the change within all repetitions of the named block within the song.

5. The software implemented digital audio workstation of claim 2, wherein the code further comprises instructions to:
create a new music clip through a microphone recording or arpeggiator.

6. The software implemented digital audio workstation of claim 5, wherein the code further comprises instructions to:
connect to a software platform and access a store for download and/or purchase of one or more available clips, tabs, decks, and/or songs.

7. The software implemented digital audio workstation of claim 6, wherein the code further comprises instructions to:
upload created content including the generated song and/or the new music clip to the store, cloud storage, or social media sites.

8. The software implemented digital audio workstation of claim 7, wherein the code further comprises instructions to:
configure license rights for use and distribution of the uploaded content.

9. The software implemented digital audio workstation of claim 8, wherein the code further comprises instructions to:
configure license rights including at least one of:
　a purchase price for other users of the software platform to acquire the uploaded content,
　a restriction to specific users of the software platform or specific groups of users of the software platform that may acquire the uploaded content,
　a limit to the number of purchases or downloads of the uploaded content by other users of the software platform.

10. The software implemented digital audio workstation of claim 6, wherein the code further comprises instructions to:
download, through the store, cloud storage, or social media sites, an available song created by another user of the software platform;
display layers of clips of the available song on the multiple tracks; and
edit the clips of the available song.

11. The software implemented digital audio workstation of claim 10, wherein the code further comprises instructions to:
display a history of the available song, including identification of users of the software platform that have edited the available song and other versions of the available song.

12. The software implemented digital audio workstation of claim 6, wherein the code further comprises instructions to:

display goals achievable to a user interacting with the displayed user interface;

track completed goals to an account of the user at the software platform; and display badges or points rewarded by the software platform for completed goals.

13. The software implemented digital audio workstation of claim 12, wherein the code further comprises instructions to:

connect training modules to one or more of the achievable goals.

14. The software implemented digital audio workstation of claim 12, wherein the code further comprises instructions to:

connect contests operated across the software platform to one or more of the achievable goals.

15. The software implemented digital audio workstation of claim 2, wherein the code further comprises instructions to:

export a file of a playable song from the generated song.

16. A software implemented digital audio workstation comprising a computer system operating code stored on a tangible non-transitory medium, the code comprising instructions to:

display a user interface for creation and editing of songs;

within the displayed user interface, display multiple tracks in a music clip layer, each track comprising one or more music clips and each track aligned side-by-side with the other tracks;

within the displayed user interface, display one or more functional layers above the music clip layer, each functional layer comprising one or more functional clips of a type associated with the functional layer;

generate cells by applying each functional clip of each functional layer to the music clip of the music layer directly under the functional clips;

generate bars of music from all side-by-side cells;

generate a song by ordering the generated bars from a beginning of the multiple more tracks to an ending of the multiple tracks;

display multiple tabs organizing music and functional clips, including:

at least one tab organizing drum music clips and associated with the music clip layer, at least one tab organizing bass music clips and associated with the music clip layer, at least one tab organizing vocal music clips and associated with the music clip layer, at least one tab organizing instrumental music clips and associated with the music clip layer, at least one tab organizing effects functional clips and associated with an effects functional layer, at least one tab organizing mixing functional clips and associated with a mixing functional layer, and at least one tab organizing key functional clips and associated with a key functional layer;

insert a music clip selected from one of the tabs organizing music clips into one of the multiple tracks in the music layer;

insert a functional clip selected from a tab organizing effects functional clips into the effects functional layer;

insert a functional clip selected from a tab organizing mixing functional clips into the mixing functional layer; and insert a functional clip selected from a tab organizing key functional clips into the key functional layer.

17. The software implemented digital audio workstation of claim 16, wherein the code further comprises instructions to:

organize clips within each displayed tab sequentially;

track the tabs and sequentially organized clips as a deck;

maintain a reference between each clip in the music layer and functional layers to a specific tab and sequence position for that clip;

switch the deck to a different deck; and generate the song using the clips of the different deck in the same tabs and sequence position as referenced.

18. The software implemented digital audio workstation of claim 16, wherein the code further comprises instructions to:

display the organized sequence of clips in one selected tab;

display a graphical identification of all clips in the layer associated with the selected tab; and display a graphical identification of each music clip in the music clip layer.

19. The software implemented digital audio workstation of claim 18, wherein the code further comprises instructions to:

store a file path to an audio file for each music clip;

store a file path to a file containing a code module for each functional clip; and generate cells by executing the code module of each functional clip of each functional layer while outputting audio from the audio file of the music clip of the music layer directly under the functional clips.

\* \* \* \* \*